US009185167B2

(12) United States Patent
Connolly

(10) Patent No.: US 9,185,167 B2
(45) Date of Patent: Nov. 10, 2015

(54) ASSOCIATING BROADCASTING DEVICE DATA WITH USER ACCOUNT

(71) Applicant: Google Inc., Mountain View, CA (US)

(72) Inventor: Emmet Connolly, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/252,311

(22) Filed: Apr. 14, 2014

(65) Prior Publication Data

US 2015/0281364 A1 Oct. 1, 2015

Related U.S. Application Data

(60) Provisional application No. 61/973,687, filed on Apr. 1, 2014.

(51) Int. Cl.
*G08B 21/00* (2006.01)
*H04L 29/08* (2006.01)

(52) U.S. Cl.
CPC ..................... *H04L 67/12* (2013.01)

(58) Field of Classification Search
USPC .......................................................... 709/203
See application file for complete search history.

(56) References Cited

U.S. PATENT DOCUMENTS

| 8,762,053 | B1* | 6/2014 | Lehman | 701/438 |
|---|---|---|---|---|
| 8,988,241 | B2* | 3/2015 | Tilvis et al. | 340/686.6 |
| 2006/0069749 | A1* | 3/2006 | Herz et al. | 709/219 |
| 2007/0098856 | A1 | 5/2007 | LePine | |
| 2009/0065578 | A1* | 3/2009 | Peterson et al. | 235/382 |
| 2012/0115111 | A1 | 5/2012 | Lepine | |
| 2012/0235812 | A1* | 9/2012 | Maia et al. | 340/539.13 |
| 2013/0053002 | A1* | 2/2013 | Hymes | 455/414.1 |
| 2013/0217332 | A1* | 8/2013 | Altman et al. | 455/41.2 |
| 2013/0217333 | A1* | 8/2013 | Sprigg et al. | 455/41.2 |
| 2013/0282438 | A1* | 10/2013 | Hunter et al. | 705/7.32 |
| 2013/0285836 | A1* | 10/2013 | Proud | 340/870.02 |
| 2013/0297422 | A1* | 11/2013 | Hunter et al. | 705/14.58 |
| 2014/0142459 | A1* | 5/2014 | Jayalth et al. | 600/547 |
| 2014/0195166 | A1* | 7/2014 | Rahman et al. | 702/19 |
| 2014/0237587 | A1* | 8/2014 | Forbes et al. | 726/18 |
| 2014/0273848 | A1* | 9/2014 | Rahman et al. | 455/41.2 |

OTHER PUBLICATIONS

"Fast Facts Bluetooth Technology 101" [online]. Jan. 9, 2014, Retrieved from the Internet: <http://www.bluetooth.com/pages/fast-facts.aspx> 2 pages.
Frequently Asked Questions Using the HAPIfork [online]. Jan. 9, 2014, Retrieved from the Internet: <http://www.hapi.com/faq.aspx> 10 pages.

(Continued)

*Primary Examiner* — Shirley Zhang
(74) *Attorney, Agent, or Firm* — Shumaker & Sieffert, P.A.

(57) ABSTRACT

A device can include at least one processor, and a telemetry module operable by the at least one processor to receive remote sensor data transmitted by a broadcasting device, wherein the remote sensor data is captured by a sensor of the broadcasting device. The system additionally can include a local sensor operable to capture local sensor data, and a sensor analysis module automatically operable by the at least one processor to associate, based at least in part on analysis of the remote sensor data and the local sensor data, the remote sensor data with a user account associated with the computing device.

28 Claims, 6 Drawing Sheets

(56) References Cited

OTHER PUBLICATIONS

"Track Your Eating with Smart 'Hapifork'" [online]. Jan. 9, 2014, Retrieved from the Internet: <http://www.pcmag.com/article2/0,2817,2413943,00.sapx> 4 pages.

International Search Report and Written Opinion of International Application No. PCT/US2015/023006, mailed Jun. 30, 2015 11 pp.

Youngki Lee et al., "MobiCon: Mobile Context Monitoring Platform—Incorporating Context-awareness to Smartphone-centric Personal Sensor Networks," 2012 9th Annual IEEE Communications Society Conference on Sensor, Mesh and Ad Hoc Communications and Networks, Jun. 18, 2012, pp. 109-111.

Hans W. Gellersen et al., "Multi-Sensor Context-Awareness in Mobile Devices and Smart Artifacts," Mobile Networks and Applications, vol. 7, No. 5, Jan. 1, 2002, pp. 341-351.

Akio Sashima et al., "Toward Mobile Sensor Fusion Platform for Context-Aware Services," Intelligent and Biosensors, InTech, Jan. 1, 2010, pp. 67-82.

\* cited by examiner

ASSOCIATING BROADCASTING DEVICE DATA WITH USER ACCOUNT

This application claims priority to U.S. Provisional Application No. 61/973,687, filed Apr. 1, 2014, the entire contents of which are incorporated herein by reference.

BACKGROUND

"Smart" devices (i.e., everyday objects configured to provide some degree of computing intelligence) are becoming more prevalent in households and in public places. Some smart devices may be located in public places (e.g., restaurants, shopping malls, hotels) and may be used by many different users in a given day or week. Typically, the process of pairing a smart device to a user's personal computing device or logging on to a smart device requires the user to perform a multistep process, such as a manual challenge-response procedure. However, due to the nature of interaction with public smart devices, a user may only use a particular public smart device once, making it unlikely that a user will go through an involved configuration process to use the public smart device. Moreover, many small smart devices may lack input mechanisms that would enable a user to log on to the smart device or pair the smart device with the user's personal computing device.

SUMMARY

In one example, the disclosure describes a method including receiving, by a first computing device associated with a user, first sensor data, the first sensor data transmitted by a broadcasting device not associated with the user, wherein the first sensor data is captured by a sensor of the broadcasting device. Additionally, the method can include receiving, by the first computing device, second sensor data, the second sensor data captured by a sensor operatively coupled to a second computing device associated with the user, and automatically associating, by the first computing device and based at least in part on analysis of the first sensor data and the second sensor data, the first sensor data with a user account associated with the user.

In another example, the disclosure describes a method including receiving, by a computing device, remote sensor data transmitted by a broadcasting device, wherein the remote sensor data is captured by a sensor of the broadcasting device, and receiving local sensor data captured by a local sensor of the computing device. Additionally, the method can include automatically associating, by the computing device and based at least in part on analysis of the remote sensor data and the local sensor data, the remote sensor data with a user account associated with the computing device.

In another example, the disclosure describes a device that includes at least one processor, and a telemetry module operable by the at least one processor to receive remote sensor data transmitted by a broadcasting device, wherein the remote sensor data is captured by a sensor of the broadcasting device. The system additionally can include a local sensor operable to capture local sensor data, and a sensor analysis module automatically operable by the at least one processor to associate, based at least in part on analysis of the remote sensor data and the local sensor data, the remote sensor data with a user account associated with the computing device.

In another example, the disclosure describes a computer-readable storage medium storing instructions that, when executed, cause at least one processor of a computing device to receive remote sensor data transmitted by a broadcasting device, wherein the remote sensor data is captured by a sensor of the broadcasting device and receive local sensor data captured by a local sensor operatively coupled to the computing device. The instructions, when executed, can also cause the at least one processor to automatically associate, based at least in part on analysis of the remote sensor data and the local sensor data, the remote sensor data with a user account associated with the computing device.

The details of one or more examples are set forth in the accompanying drawings and the description below. Other features, objects, and advantages will be apparent from the description and drawings, and from the claims.

DETAILED DESCRIPTION

Figure 1:
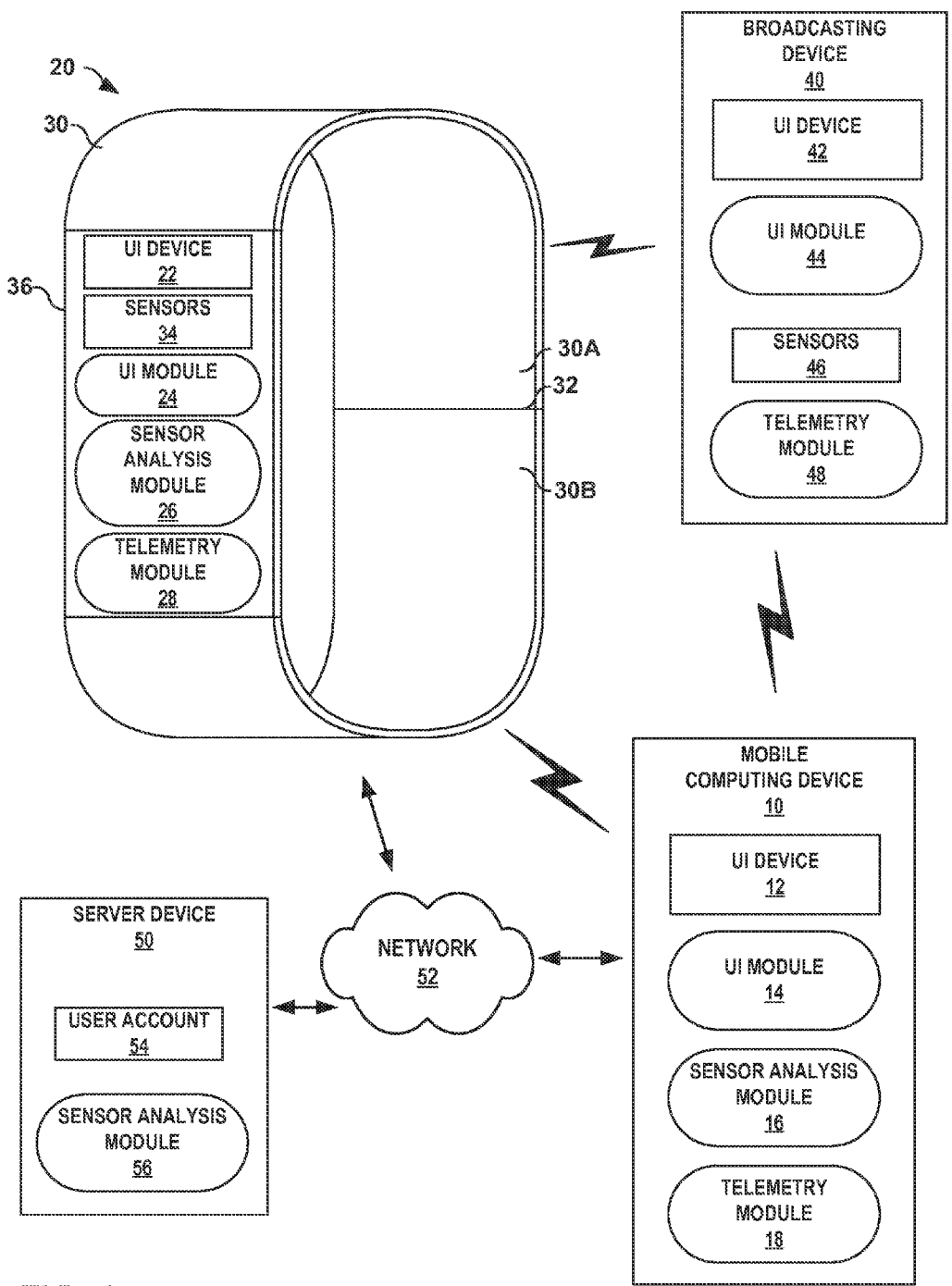
FIG. 1 is a conceptual block diagram illustrating an example system including a mobile computing device, a wearable computing device, a broadcasting device, and a server device, in which one or more of the devices are operable to automatically determine whether to associate sensor data received from the broadcasting device with a user account, in accordance with one or more techniques of the disclosure.

Techniques according to the disclosure relate to a system for automatically associating sensor data generated by a broadcasting device with a user account. In some implementations, the system may include one or more computing devices, such as a wearable computing device and/or a mobile computing device. The broadcasting device and the computing device can be communicatively coupled using, e.g., a wireless communication protocol. In some implementations, the computing device can receive sensor data broadcast by a broadcasting device to determine whether to associate the sensor data from the broadcasting device with a user account associated with the computing device. In some implementations, a mobile computing device can analyze first sensor data received from the broadcasting device and second sensor data received from a wearable computing device, and can determine based on the analysis whether to associate the first sensor data from the broadcasting device with a user account associated with the mobile computing device.

In some examples, the wearable computing device can be operable to determine that the broadcasting device is within the threshold distance of the wearable computing device. In some examples, an indication that the wearable computing device and broadcasting device are in wireless communication with each other can be an indication that the wearable computing device and broadcasting device are within the threshold distance of each other. In some examples, responsive to receiving the indication that the wearable computing device is being worn and based at least in part on an indication that the devices are within a threshold distance of each other, one or both of the devices can be operable to output an alert that notifies a user of the computing device that broadcast data has been detected that could be associated with a user account of the user of the computing device. The computing device may output the alert (e.g., for display at a display device) to prompt a user of the computing device to input an indication of approval to associate broadcast sensor data with the user account, or to input an indication not to associate the broadcast sensor data with the user account. Responsive to receiving an indication of user input approving association of the broadcast data with the user account, the computing device is operable to effect the association. In some examples, the computing device may transmit the broadcast sensor data to a server device with an instruction to the server device to associate the broadcast sensor data with the user account.

In some examples, when the computing device is within a threshold distance of the broadcasting device, the mobile computing device may automatically determine whether data received from a broadcasting device should likely be correlated with a user account without requiring the user to provide input to log in to an account associated with each broadcasting device each time the user wants to correlate data from the broadcasting device with their user account. In this manner, techniques of this disclosure may enable a computing device to more easily obtain information from a broadcasting device by leveraging the fact that the user has already been authenticated by his/her wearable computing device or mobile computing device to automatically associate the sensor data from the broadcasting device with the user account (thereby obviating the need for the user to provide input for authentication by the broadcasting device).

In situations in which the systems discussed here collect personal information about users, or may make use of personal information, the users may be provided with an opportunity to control whether programs or features collect user information (e.g., information about a user's social network, social actions or activities, profession, a user's preferences, sensor data related to a user's activities or health, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a conceptual block diagram illustrating an example system including a mobile computing device 10, a wearable computing device 20, a broadcasting device 40, and a server device 50, in which one or more of the devices 10 and 20 are operable to automatically determine whether to associate sensor data received from broadcasting device 40 with a user account, in accordance with one or more techniques of the disclosure. In the example of FIG. 1, mobile computing device 10 includes at least one user interface (UI) device 12, a UI module 14, a sensor analysis module 16, and a telemetry module 18. Other examples of mobile computing device 10 that implement techniques of this disclosure may include additional components not shown in FIG. 1. Examples of mobile computing device 10 may include, but are not limited to, portable devices such as mobile phones (including smart phones), laptop computers, tablet computers, cameras, personal digital assistants (PDAs), etc.

Wearable computing device 20 can include a UI device 22, sensors 34, a UI module 24, a sensor analysis module 26, a telemetry module 28, and a band 30. In some examples, UI device 22 and other electronic components of wearable computing device 20 may be at least partially enclosed by a housing 36. Wearable computing device 20 can include band 30 or other member, such as a strap or frame, for physically securing wearable computing device 20 when being worn by a user. In the example of FIG. 1, band 30 is mechanically coupled to housing 36. In some examples, instead of band 30 and housing 36 being separate structures mechanically coupled to each other, band 30 and housing 36 may be a single, unitary structure. As shown in the example of FIG. 1, the first portion 30A of band 30 and second portion 30B of band 30 mechanically connect at connecting structure 32. Connecting structure 32 can include, for example, a clasp, clip, snap, buckle or other mechanism operable to physically secure first portion 30A and second portion 30B of band 20 when a user wears wearable computing device 20. Examples of wearable computing device 20 can include, but are not limited to, a smart watch, bracelet, wristband, ankle band, etc. Other examples of wearable computing device 20 that implement techniques of this disclosure may include additional components not shown in FIG. 1.

Mobile computing device 10 can include at least one UI device 12. A user associated with mobile computing device 10 can interact with mobile computing device 10 by providing various user inputs into mobile computing device 10, e.g., using at least one UI device 12. In some examples, the at least one UI device 12 is configured to receive tactile, audio, or visual input. In addition to receiving input from a user, UI device 12 can be configured to output content such as a graphical user interface (GUI) for display, e.g., at a display device associated with mobile computing device 10. In some examples, UI device 12 can include a display and/or a presence-sensitive input device. In some examples, the display and the presence-sensitive input device may be integrated into a presence-sensitive display, which displays the GUI and receives input from the user using capacitive, inductive, and/or optical detection at or near the presence sensitive display. In other examples, the display device can be physically separate from a presence-sensitive device associated with mobile computing device 10.

As shown in FIG. 1, mobile computing device 10 also can include UI module 14. UI module 14 can perform one or more functions to receive indications of input, such as user input, and send the indications of the input to other components associated with mobile computing device 10, such as sensor analysis module 16. For example, UI module 14 may receive an indication of a gesture performed by the user at UI device 12. UI module 14 may also receive information from components associated with mobile computing device 10, such as sensor analysis module 16. Using the information, UI module 14 may cause other components associated with mobile computing device 10, such as UI device 12, to provide output based on the information. For instance, UI module 14 may receive data from a notification module of mobile computing device 10 (not shown) and cause UI device 12 to display information, such as an alert, at a display device associated with mobile computing device 10 (e.g., which is part of mobile computing device 10 or is operably coupled to mobile computing device 10).

UI module 14 can be implemented in various ways. For example, UI module 14 can be implemented as a downloadable or pre-installed application or "app." In another example, UI module 14 can be implemented as part of a hardware unit of mobile computing device 10. In another example, UI module 14 can be implemented as part of an operating system of mobile computing device 10.

In the example of FIG. 1, mobile computing device 10 also includes a telemetry module 18. Mobile computing device 10 can use telemetry module 18 to communicate with external devices via one or more networks, such as one or more wireless networks. Examples of such wireless networks may include Bluetooth, 3G, and WiFi wireless networks. In some examples, mobile computing device 10 uses telemetry module 18 to wirelessly communicate with wearable computing device 20 and/or broadcasting device 40.

In some examples, broadcasting device 40 can include a UI device 42, a UI module 44, sensors 46, and a telemetry module 48. In some examples, broadcasting device 40 may include a Bluetooth low energy (BLE) beacon. Other examples of broadcasting device 40 that implement techniques of this disclosure may include additional components not shown in FIG. 1. In various examples, broadcasting device 40 may be a piece of cutlery (e.g., a fork, spoon, or knife), a household appliance such as a kitchen or bathroom appliance, a door, a step, an escalator, a chair, a bag, a cup, a food wrapper (e.g., a candy wrapper), a shoe, a thermometer, a toothbrush, a medical device, a fitness device or item of fitness equipment, a wellness device; etc.

Broadcasting device 40 can include at least one UI device 42. A user making use of broadcasting device 40 may, in some examples, interact with broadcasting device 40 by providing various user inputs into broadcasting device 40, e.g., using at least one UI device 42. In some examples, the at least one UI device 42 is configured to receive tactile, audio, or visual input. In addition to receiving input from a user, UI device 42 can be configured to output content such as a graphical user interface (GUI) for display, e.g., at a display device associated with broadcasting device 40. In some examples, UI device 42 can include a display and/or a presence-sensitive input device. In some examples, the display and the presence-sensitive input device may be integrated into a presence-sensitive display, which displays the GUI and receives input from the user using capacitive, inductive, and/or optical detection at or near the presence sensitive display.

As shown in FIG. 1, broadcasting device 40 also can include UI module 44. UI module 44 can perform one or more functions to receive indication of input, such as user input. UI module 44 may also receive information from components associated with wearable computing device 40, such as sensor 46. Using the information, UI module 44 may cause other components associated with broadcasting device 40, such as UI device 42, to provide output based on the information. For instance, UI module 44 may receive information from sensor 46 and cause UI device 42 to display information at a display device associated with broadcasting device 40 (e.g., which is part of broadcasting device 40 or is operably coupled to broadcasting device 40).

UI module 44 may be implemented in various ways. For example, UI module 44 can be implemented as a downloadable or pre-installed application or "app." In another example, UI module 44 can be implemented as part of a hardware unit of broadcasting device 40. In another example, UI module 44 can be implemented as part of an operating system of broadcasting device 40.

In the example of FIG. 1, broadcasting device 40 also includes a telemetry module 48. Broadcasting device 40 can utilize telemetry module 48 to communicate with external devices via one or more networks, such as one or more wireless networks. Examples of such wireless networks may include Bluetooth, 3G, and WiFi wireless networks. In some examples, broadcasting device 40 uses telemetry module 48 to wirelessly communicate with mobile computing device 10 and/or wearable computing device 20.

Broadcasting device 40 also includes sensors 46. In some examples, sensors 46 may include one or more of an accelerometer, a proximity sensor, an infrared sensor, a camera, a barometric pressure sensor, a temperature sensor, or a gyroscope. Example sensor data indicative of parameters sensed by sensor 46 may include may include temperature data, gyroscopic data, camera data, barometric pressure data, or proximity data, such as data indicating proximity of broadcasting device 40 to wearable computing device 20 (e.g., based on a Bluetooth signal). In some examples, broadcasting device 40 may include multiple sensors, which can be of different types.

Similarly, wearable computing device 20 can include at least one UI device 22. A user associated with wearable computing device 20 may interact with wearable computing device 20 by providing various user inputs into wearable computing device 20, e.g., using at least one UI device 22. In some examples, the at least one UI device 22 is configured to receive tactile, audio, or visual input. In addition to receiving input from a user, UI device 22 can be configured to output content such as a graphical user interface (GUI) for display, e.g., at a display device associated with wearable computing device 20. In some examples, UI device 22 can include a display and/or a presence-sensitive input device. In some examples, the display and the presence-sensitive input device may be integrated into a presence-sensitive display, which displays the GUI and receives input from the user using capacitive, inductive, and/or optical detection at or near the presence sensitive display. In other examples, the display device can be physically separate from a presence-sensitive device associated with wearable computing device 20.

As shown in FIG. 1, wearable computing device 20 also can include UI module 24. UI module 24 can perform one or more functions to receive indication of input, such as user input, and send the indications of the input to other components associated with wearable computing device 20, such as sensor analysis module 26. For example, UI module 24 may receive an indication of a gesture performed by the user at UI device 22. UI module 24 may also receive information from components associated with wearable computing device 20, such as sensor analysis module 26. Using the information, UI module 24 may cause other components associated with wearable computing device 20, such as UI device 22, to provide output based on the information. For instance, UI module 24 may receive data from a notification module of wearable computing device 20 (not shown) and cause UI device 22 to display information, such as an alert, at a display device associated with wearable computing device 20 (e.g., which is part of wearable computing device 20 or is operably coupled to wearable computing device 20).

UI module 24 may be implemented in various ways. For example, UI module 24 can be implemented as a downloadable or pre-installed application or "app." In another example, UI module 24 can be implemented as part of a hardware unit of wearable computing device 20. In another example, UI module 24 can be implemented as part of an operating system of wearable computing device 20.

In the example of FIG. 1, wearable computing device 20 also includes a telemetry module 28. Wearable computing device 20 can utilize telemetry module 28 to communicate with external devices via one or more networks, such as one or more wireless networks. Examples of such wireless networks may include Bluetooth, 3G, and WiFi wireless networks. In some examples, wearable computing device 20 utilizes telemetry module 28 to wirelessly communicate with mobile computing device 10 and/or broadcasting device 40.

Wearable computing device 20 also includes sensors 34. Sensors 34 can include, for example, at least one of an accelerometer, a proximity sensor, an infrared sensor, a camera, a barometric pressure sensor, a temperature sensor, or a gyroscope. For example, sensor 34 can be configured to detect a parameter indicative of movement of wearable computing device 20.

In some examples, broadcasting device 40, mobile computing device 10, and/or wearable computing device 20 may be operatively coupled to an external network using respective network links. The external network, such as network 52, may include network hubs, network switches, network routers, etc., that are operatively inter-coupled thereby providing for the exchange of information between broadcasting device 40, mobile computing device 10, and wearable computing device 20 (and/or other computing devices). Such connections may be wireless and/or wired connections. In some examples, mobile computing device 10 may be communicatively coupled to wearable computing device 20 using direct device communication. In these and other examples, mobile computing device 10 may be communicatively coupled to broadcasting device 40 using direct device communication. In these and other examples, wearable computing device 20 may be communicatively coupled to broadcasting device 40 using direct device communication. Direct device communication may include communications through which mobile computing device 10 sends and receives data directly with wearable computing device 20, e.g., using wireless communication. That is, in some examples of direct device communication, data sent by mobile computing device 10 may not be forwarded by one or more additional devices before being received at wearable computing device 20, and vice-versa. Examples of direct device communication techniques may include Bluetooth, Bluetooth low energy (BLE), Near-Field Communication, infrared, etc.

Both wearable computing device 20 and broadcasting device 40 will generate sensor data via the respective sensors 34 and 46. Telemetry modules 28, 18, of wearable computing device 20 and/or mobile computing device 10 can scan for data being broadcast from any broadcasting device such as broadcasting device 40, e.g., using Bluetooth low energy (BLE). When broadcasting device 40 comes into close proximity to mobile computing device 10 or a wearable computing device 20, the respective telemetry module 18, 28 can receive the signal broadcast by telemetry module 48 of broadcasting device 40, where the signal includes data from sensor 46 of broadcasting device 40.

Upon receiving a signal broadcast by telemetry module 48 of broadcasting device 40, the respective sensor analysis module 16, 26 of mobile computing device 10 and/or wearable computing device 20 can analyze the sensor data using heuristics that match multiple sensor data items together, and may compare the received sensor data with sensor data received by sensor 34 of wearable computing device 20, for example. Sensor analysis module 16, 26 can determine based on the analysis whether to associate data from broadcasting device 40 with a user account associated with mobile computing device 10 and/or wearable computing device 20. In some examples, sensor analysis module 16, 26 can determine based on the analysis whether to associate broadcasting device 40 with the user account and, based on that association, associate the data received from broadcasting device 40 with the user account.

In accordance with one or more aspects of the disclosure, wearable computing device 20 can include sensor analysis module 26, and mobile computing device 10 can include sensor analysis module 16. Sensor analysis modules 16 and 26 can be implemented in various ways. For example, sensor analysis modules 16 and 26 can be implemented as a downloadable or pre-installed application or "app." In other examples, sensor analysis modules 16 and 26 can be implemented as part of hardware units of mobile computing device 10 and wearable computing device 20, respectively, or as part of operating systems of mobile computing device 10 and wearable computing device 20, respectively.

Sensor analysis module 26 and/or sensor analysis module 16 can receive first sensor data that was transmitted by broadcasting device 40 and second sensor data that was generated by sensor 34 of wearable computing device 20. Sensor analysis module 26 and/or sensor analysis module 16 can analyze the first sensor data and the second sensor data and can determine, based on the analysis, whether to automatically associate the first sensor data from broadcasting device 40 with a user account associated with the user of wearable computing device 20 and/or mobile computing device 10. For example, sensor analysis module 26 or 16 can compare the first sensor data with the second sensor data to detect similarities or other relationships between the sensor data to determine whether it is likely that the sensor data should be associated with the user account. In some examples, the first sensor data and the second sensor data may be of the same type (e.g., both accelerometer data), while in other examples the first sensor data and the second sensor data may be of different types. In some examples, data from more than two sensors and/or sensor types can be studied together.

Sensor analysis module 26 and/or sensor analysis module 16 can also be operable to receive an indication that a distance between broadcasting device 40 and wearable computing device 20 is less than a threshold distance. Sensor analysis module 26 or 16 can, in some examples, include this indication as a factor in determining whether to associate the first sensor data with the user account. Sensor analysis module 26 or 16 can consider the indication that the distance is less than a threshold distance along with analysis of sensor data. For example, these may be various factors in a heuristics determination.

In some examples, the indication that the distance between mobile computing device 10 and wearable computing device 20 is less than a threshold distance may be the presence of a wireless communication link between broadcasting device 40 and wearable computing device 20. The wireless communication link can be, for example, a direct wireless communication connection, such as Bluetooth or WiFi wireless network connection. In other examples, telemetry module 28 of wearable computing device 20 can be operable to determine that the distance between devices 40 and 20 is less than the threshold distance based at least in part on a wireless communication signal generated by telemetry module 48 and received by telemetry module 28. In other examples, telemetry module 28 of wearable computing device 20 can be operable to determine that the distance between devices 40 and 20 is less than the threshold distance based at least in part on another type of signaling between devices 40 and 20, such as an optical signal generated by broadcasting device 40 and received by wearable computing device 20, or an audible signal generated by broadcasting device 40 and received by wearable computing device 20.

In some examples, the technique may be implemented solely by wearable computing device 20. That is, in some examples, sensor analysis module 26 can be operable to receive local sensor data from sensor 34 and remote sensor data from sensor 46 via telemetry module 28, and can be operable to analyze the local sensor data and remote sensor data to determine whether it is likely that the remote sensor data should be associated with a user account. In some examples, responsive to determining based on the analysis that the remote sensor data from sensor 46 should be associated with the user account, sensor analysis module 26 can be operable to cause UI module 24 to output an alert for display by UI device 22 soliciting user approval to associate remote sensor data with the user account.

Responsive to receiving an indication of received user input approving the associating of the remote sensor data with the user account, sensor analysis module 26 can be operable to cause telemetry module 28 to output an instruction to server device 50 (e.g., via network 52) instructing server device 50 to associate the remote sensor data with a user account of user accounts 54, and sensor analysis module 26 can be operable to cause telemetry module 28 to transmit the remote sensor data to server device 50 as the remote sensor data is received by wearable computing device 20, and server device 50 can associate the remote sensor data with the user account as the remote sensor data is received.

In other examples, the technique may be implemented solely by mobile computing device 10. That is, in some examples, sensor analysis module 16 can be operable to receive first sensor data from sensor 46 and second sensor data from sensor 34 via telemetry module 28, and sensor analysis module 16 can be operable to analyze the local sensor data and remote sensor data to determine whether it is likely that the remote sensor data should be associated with a user account.

In other examples, responsive to receiving an indication that the remote sensor data from sensor 46 should be associated with the user account, one or both of sensor analysis modules 16 and 26 can be operable to output an alert, e.g., to the corresponding UI module 14 or 24. In some examples, the alert includes a user interface screen (for display at the corresponding UI device 12 or 22) that prompts the user to input an indication of approval or disapproval to associate sensor data received from broadcasting device 40 with a user account of the user.

In some examples, sensor device 50 can include sensor analysis module 56 and user accounts 54. Other examples of server device 50 that implement techniques of this disclosure may include additional components not shown in FIG. 1. Examples of server device 50 can include, but are not limited to, one or more computing devices, etc.

In some examples, sensor analysis module 26 of wearable computing device 20 and/or sensor analysis module 16 of mobile computing device 10 can be operable to transmit information (e.g., by one of telemetry module 28, 18, respectively) to sensor analysis module 56 of server device 50. In these examples, sensor analysis module 56 of server device 50 can additionally or alternatively analyze sensor data from sensor 46 and/or sensor 34 to determine whether to associate the sensor data from broadcasting device 40 with the user account. In other examples, one of wearable computing device 20 and mobile computing device 10 is operable to instruct server device 50 to associate the sensor data with one of user accounts 54.

In other examples, the technique may be implemented solely by any one of mobile computing device 10, wearable computing device 20, or server device 50. In other examples, some steps of the technique may be implemented by mobile computing device 10 and other steps of the technique may be implemented by wearable computing device 20. In other examples, some steps of the technique may be implemented by mobile computing device 10 and other steps of the technique may be implemented by server device 50. In other examples, some steps of the technique may be implemented by wearable computing device 20 and other steps of the technique may be implemented by server device 50. In some examples, some steps of the technique (e.g., determining that remote sensor data should be associated with a user account and outputting an alert soliciting approval to associate remote sensor data with the user account) can be performed by both of mobile computing device 10 and wearable computing device 20.

In one example, broadcasting device 40 may be a smart fork device. The smart fork device may be one of many (e.g., hundreds) of such devices located at a particular restaurant. A given user making use of a the smart fork broadcasting device 40 does not need to provide input to the smart fork device, but instead the smart fork device can be communicatively coupled with a device associated with the user, such as wearable computing device 20 or mobile computing device 10, by which the user has already been authenticated. Mobile computing device 10 and wearable computing device 20 can detect a signal broadcast by the smart fork broadcasting device 40, and analyze sensor data contained in the signal being broadcast.

In some examples, the sensor data broadcast by the smart fork broadcasting device 40 may be accelerometer data collected by an accelerometer sensor (e.g., sensor 46) of broadcasting device 40. Sensor analysis modules 16, 26 of either or both of mobile computing device 10 or wearable computing device 20 can analyze the accelerometer data, and may, in some examples, compare the accelerometer data from the smart fork broadcasting device 40 to accelerometer data collected by an accelerometer sensor (e.g., sensor 34) of wearable computing device 20, for example. For example, if the user is wearing wearable computing device 20 on a wrist corresponding to the hand which is holding the smart fork broadcasting device 40, one or both of sensor analysis modules 16, 26 may be able to determine that the accelerometer data from the smart fork broadcasting device 40 and the accelerometer data from wearable computing device 20 show certain similarities. Based on this analysis, one or both of sensor analysis modules 16, 26 can determine that sensor data from the smart fork broadcasting device 40 should be associated with a user account to which wearable computing device 20 or mobile computing device 10 is already logged in.

In another example, even where the user is wearing wearable computing device 20 on a wrist not corresponding to the hand holding the smart fork broadcasting device 40, there may still be certain characteristics of the accelerometer data which sensor analysis module(s) 16, 26 can correlate and determine to indicate that user wearing wearable computing device 20 is also using the smart fork broadcasting device 40.

In other examples, data other than accelerometer data may be obtained and analyzed by sensor analysis module(s) 16, 26 to determine whether the sensor data from broadcasting device 40 should be associated with the user account. In one example, sensor analysis module(s) 16, 26 may analyze proximity sensor data and barometric pressure sensor data to indicate relative positioning of each device (e.g., a foot sensor on a shoe should be located below a watch device).

In another example, broadcasting device 40 may be a treadmill at a gym. Sensor analysis module 26 or 16 may compare accelerometer data from sensor 34 of wearable computing device 20 to a speed indicated by sensor data received from the treadmill, and may determine a correlation between the speed that the treadmill tread is moving and the accelerometer data. If sensor analysis module 26 or 16 determines based on the analysis of the data that it is likely that the treadmill data should be associated with the user of the wearable computing device 20, sensor analysis module can automatically associate the data received from the treadmill with the user account, e.g., by sending the treadmill data to server device 50, without the user having to manually pair the treadmill with the wearable computing device 20 or log in to the treadmill.

As another example, broadcasting device 40 may be a weighing scale that automatically broadcasts a signal indicating sensor data of sensed weight and percentage of body fat. Mobile computing device 10 or wearable computing device 20 can, by the respective telemetry module, detect the signal and determine that the scale data should be associated with a user account with which the device is associated. For example, a vicinity module 74, 94 may determine that the respective device is in proximity to the scale and therefore the user is likely using the scale, so the scale data will be automatically associated with the user account. The computing device may output an alert soliciting approval of the association before automatically associating the scale data with the user account.

Figure 2:
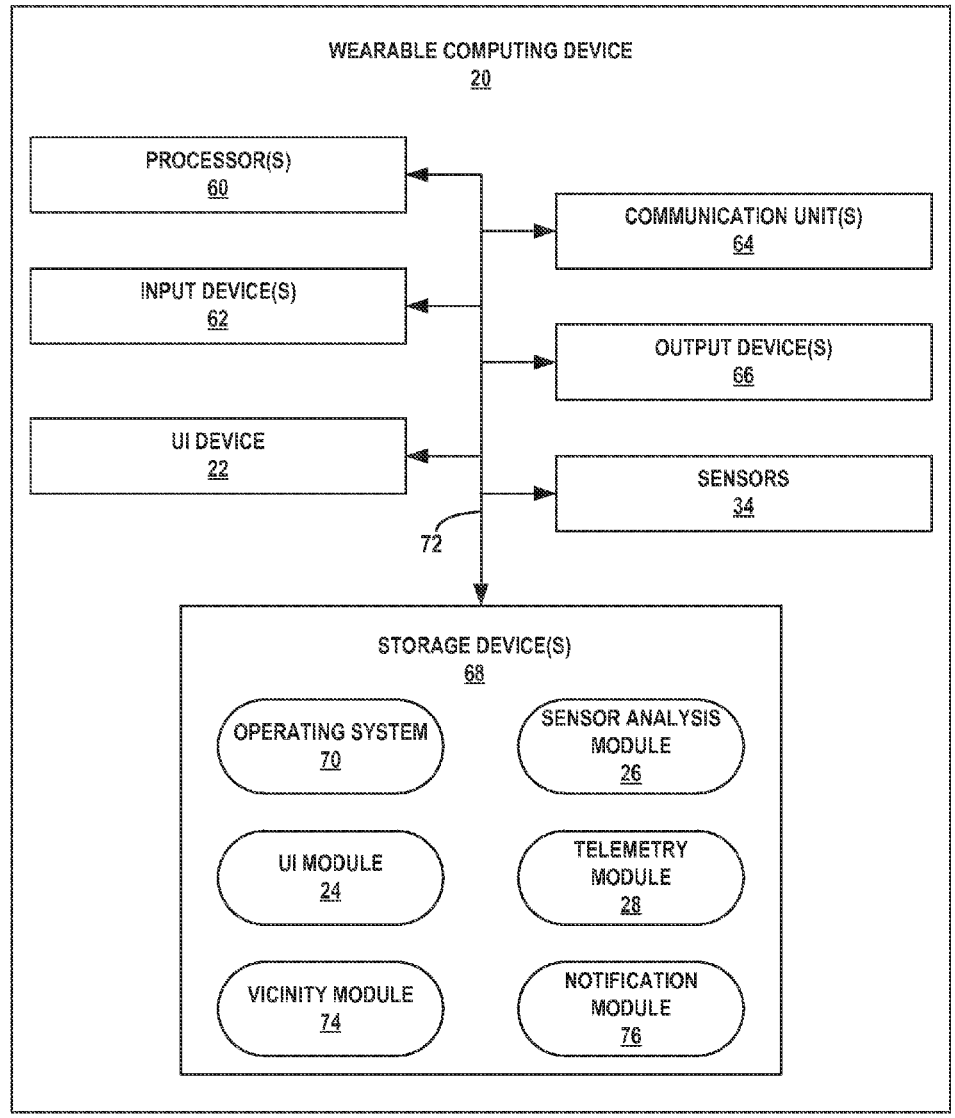
FIG. 2 is a block diagram illustrating further details of one example of a wearable computing device as shown in FIG. 1, in accordance with one or more techniques of the disclosure.

FIG. 2 is a block diagram illustrating further details of one example of a wearable computing device as shown in FIG. 1, in accordance with one or more techniques of the disclosure. FIG. 2 illustrates only one particular example of wearable computing device 20 as shown in FIG. 1, and many other examples of wearable computing device 20 may be used in other instances.

As shown in the example of FIG. 2, wearable computing device 20 includes one or more processors 60, one or more input devices 62, one or more communication units 64, one or more output devices 66, one or more storage devices 68, user interface (UI) device 22, and sensors 34. In the example of FIG. 2, wearable computing device 20 further includes UI module 24, sensor analysis module 26, telemetry module 28, vicinity module 74, notification module 76, and operating system 70, which are executable by one or more processors 60. Each of components 22, 34, 60, 62, 64, 66, and 68 are coupled (physically, communicatively, and/or operatively) using communication channels 72 for inter-component communications. In some examples, communication channels 72 may include a system bus, a network connection, an inter-process communication data structure, or any other method for communicating data. UI module 24, sensor analysis module 26, telemetry module 28, vicinity module 74, notification module 76, and operating system 70 may also communicate information with one another, as well as with other components in wearable computing device 20.

One or more processors 60, in one example, are configured to implement functionality and/or process instructions for execution within wearable computing device 20. For example, processors 60 may be capable of processing instructions stored by storage device 68. Examples of one or more processors 60 can include any one or more of a microprocessor, a controller, a DSP, an ASIC, a FPGA, or equivalent discrete or integrated logic circuitry.

One or more storage devices 68 may be configured to store information within wearable computing device 20 during operation. Storage devices 68, in some examples, include a computer-readable storage medium or computer-readable storage device. In some examples, storage devices 68 include a temporary memory, meaning that a primary purpose of storage device 68 is not long-term storage. Storage devices 68, in some examples, include a volatile memory, meaning that storage device 68 does not maintain stored contents when power is not provided to storage device 68. Examples of volatile memories include random access memories (RAM), dynamic random access memories (DRAM), static random access memories (SRAM), and other forms of volatile memories known in the art. In some examples, storage devices 68 are used to store program instructions for execution by processors 60. Storage devices 68, in some examples, are used by software or applications running on wearable computing device 20 (e.g., sensor analysis module 26) to temporarily store information during program execution.

In some examples, storage devices 68 may further include one or more storage device 68 configured for longer-term storage of information. In some examples, storage devices 68 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Wearable computing device 20, in some examples, also includes one or more communication units 64. Wearable computing device 20, in one example, utilizes communication unit 64 to communicate with external devices via one or more networks, such as one or more wireless networks. Communication unit 64 may be a network interface card, such as an Ethernet card, an optical transceiver, a radio frequency transceiver, or any other type of device that can send and receive information. Other examples of such network interfaces may include Bluetooth, 3G, and WiFi radios computing devices as well as Universal Serial Bus (USB). In some examples, wearable computing device 20 utilizes communication unit 64 to wirelessly communicate with an external device such as mobile computing device 10. Communication units 64 can be controlled by telemetry module 28.

Wearable computing device 20, in one example, also includes one or more input devices 62. Input device 62, in some examples, is configured to receive input from a user through tactile, audio, or video sources. Examples of input device 62 include a presence-sensitive device, such as a presence-sensitive display, a mouse, a keyboard, a voice responsive system, video camera, microphone or any other type of device for detecting a command from a user. In some examples, a presence-sensitive display includes a touch-sensitive display.

One or more output devices 66 may also be included in wearable computing device 20. Output device 66, in some examples, is configured to provide output to a user using tactile, audio, or video stimuli. Output device 66, in one example, includes a presence-sensitive display, a sound card, a video graphics adapter card, or any other type of device for converting a signal into an appropriate form understandable to humans or machines. Additional examples of output device 66 include a speaker, a CRT monitor, a LCD, OLED, or any other type of device that can generate intelligible output to a user. In some examples, UI device 22 may include functionality of one or more of input devices 62 and/or output devices 66.

Wearable computing device 20 also can include UI device 22. In some examples, UI device 22 is configured to receive tactile, audio, or visual input. In addition to receiving input from a user, UI device 22 can be configured to output content such as a GUI for display at a display device, such as a presence-sensitive display. In some examples, UI device 22 can include a presence-sensitive display that displays a GUI and receives input from a user using capacitive, inductive, and/or optical detection at or near the presence sensitive display. For example, UI device 22 may receive input from the user in responding to an alert generated by notification module 76. In some examples, UI device 22 is both one of input devices 64 and one of output devices 66.

In some examples, UI device 22 of wearable computing device 20 may include functionality of input devices 62 and/or output devices 66. In some examples, a presence-sensitive device may detect an object at and/or near the presence-sensitive device. As one example range, a presence-sensitive device may detect an object, such as a finger or stylus, which is within two inches or less of the presence-sensitive device. The presence-sensitive device may determine a location (e.g., an (x,y) coordinate) of the presence-sensitive device at which the object was detected. In another example range, a presence-sensitive device may detect an object six inches or less from the presence-sensitive device. Other example ranges are also possible. The presence-sensitive device may determine the location of the device selected by the object using capacitive, inductive, and/or optical recognition techniques. In some examples, the presence-sensitive device provides output to a user using tactile, audio, or video stimuli as described with respect to output device 66.

Wearable computing device 20 may include operating system 70. Operating system 70, in some examples, controls the operation of components of wearable computing device 20. For example, operating system 70, in one example, facilitates the communication of UI module 24 and sensor analysis module 26 with processors 60, communication units 64, storage devices 68, input devices 62, output devices 66, and sensor 34. UI module 24, sensor analysis module 26, telemetry module 28, notification module 76, and vicinity module 74, can each include program instructions and/or data that are executable by wearable computing device 20 (e.g., by one or more processors 60). As one example, UI module 24 can include instructions that cause wearable computing device 20 to perform one or more of the operations and actions described in the present disclosure.

In some examples, sensors 34 can be configured to detect a parameter indicative of motion of wearable computing device 20. For example, sensors 34 can include one or more of an accelerometer, a gyroscopic sensor; etc. In some examples, sensors 34 can be configured to detect a temperature of an environment in which wearable computing device is located. In some examples, sensors 34 can be configured to detect a body temperature, heart rate, pulse, or other biometric data of a user wearing wearable computing device 20. In some examples, sensors 34 can be configured to detect a parameter indicative of wearable computing device 20 being worn by a user, and generate an indication that wearable computing device 20 is being worn by the user. For example, sensors 34 can include a proximity sensor, such as an infrared proximity sensor; a capacitive sensor; a light sensor; a physical button or contact; etc. In some examples, sensors 34 can be configured to generate a signal indicative of the sensor data. Sensor analysis module 26 can then receive the signal indicative of the sensor data. As described above, sensor analysis module 26 may determine, based on analysis of sensor data such as local sensor data from sensors 34 of wearable computing device and remote sensor data from sensors 46 of broadcasting device 40, that the remote sensor data should likely be associated with a user account of a user to which wearable computing device 20 belongs.

Wearable computing device 20 may include notification module 76. Notification module 76 may perform one or more functions to generate alerts and to send data to UI device module 6 to cause UI device 4 to display the generated alerts. Alerts generated by notification module 8 may include content such as text, graphics, audio, video, and the like that includes information indicative of an event that triggered notification module 76 to generate the alerts. For example, as described above, sensor analysis module 26 may determine, based on analysis of sensor data, that the remote sensor data should likely be associated with a user account of a user to which wearable computing device 20 belongs. In some examples, responsive to this determination, sensor analysis module 26 may instruct notification module to output an alert soliciting user approval to associate the remote sensor data with the user account. In some examples, the alert may be presented as an "opt in" option or an "opt out" option.

In these and other examples, sensor analysis module 26 may determine a threshold confidence score, and sensor analysis module 26 may only instruct notification module 76 to output an alert soliciting user approval if sensor analysis module 26 determines that the confidence score is below the threshold score. If sensor analysis module 26 determines that the confidence score is at or above the threshold score, for example, sensor analysis module 26 may associate the remote sensor data with the user account without instructing notification module 76 to output an alert soliciting user approval. Notification module 76 may, for example, initially solicit an overall user approval to operate in a mode described above, in which sensor analysis module 26 skips the step of soliciting user approval to associate remote sensor data with the user account when a confidence score is above the threshold, and may operate in this mode only in response to receiving such initial user approval.

In some example, sensor analysis module 26 uses different threshold confidence scores depending on the type of broadcasting device and/or the type of sensor data. For example, where the sensor data is of a private or sensitive nature, such as medical data (e.g., a person's weight), sensor analysis module 26 may use a higher confidence score threshold when determining whether the sensor data should be automatically associated with a user account. In addition, sensor analysis module 26 may selectively invoke notification module 76 to output an alert requesting approval to associate the sensor data with the user account depending on the type of sensor data. For example, for more sensitive types of sensor data, sensor analysis module 26 may be more likely to invoke notification module 76 to output an alert requesting approval.

In some examples, wearable computing device 20 can also include vicinity module 74. In other examples, wearable computing device 20 may not include vicinity module 74. Vicinity module 74 can be operable to determine that a distance between broadcasting device 40 and wearable computing device 20 (FIG. 1) is less than a threshold distance. In some examples, vicinity module 74 may determine whether the distance between broadcasting device 40 and wearable computing device 20 is less than the threshold distance based at least in part on whether broadcasting device 40 is within range to communicate with wearable computing device 20 using one or more communication units 64, e.g., via a direct communication protocol between broadcasting device 40 and wearable computing device 20, such as a Bluetooth or WiFi wireless network connection. For example, when broadcasting device 40 is able to establish a direct wireless communication connection with wearable computing device 20, vicinity module 74 can be operable to determine that the distance between broadcasting device 40 and wearable computing device 20 is less than the threshold distance.

In some examples, sensor analysis module 26 may modify, over time, its analysis of received sensor data to make an improved determination of whether to associate sensor data with a user account. For example, the sensor data may be broadcast by telemetry module 48 along with other information such as an identifier of broadcasting device 40. Sensor analysis module 26 may store in a data structure the identifier of a broadcasting device for which a user of wearable computing device 20 has previously indicated approval to associate with their user account. When sensor analysis module 26 later detects sensor data from a broadcasting device having an identifier that matches a stored identifier, sensor analysis module 26 may skip a step of outputting an alert to the user, and automatically associate the sensor data with the user account without requiring user approval.

For example, a user may use a particular piece of fitness equipment (e.g., a treadmill) regularly at a gym, and the treadmill may be a broadcasting device 40 that broadcasts sensor data specifying a speed, inclination, etc. of the treadmill, along with a treadmill identifier (ID). Sensor analysis module 26 may initially invoke notification module 76 to output an alert requesting approval to associate the treadmill data with the user's account, but after receiving an indication of user approval, if sensor analysis module 26 subsequently analyzes broadcast data from the same treadmill ID sensor analysis module 26 may automatically associate the treadmill data with the user account due to a high likelihood of the association being appropriate. The number of times that the user must approve the association before sensor analysis module 26 will automatically associate may be configurable.

In other examples, vicinity module 74 can be operable to determine an approximate distance between broadcasting device 40 and wearable computing device 20. For example, vicinity module 74 can be operable to estimate the distance between broadcasting device 40 and wearable computing device 20 based at least in part on a signal generated by one of devices 40 and 20 and received by the other of devices 40 and 20. The signal may include, for example, a wireless communication signal, an optical signal, an audible signal, etc.

Wearable computing device 20 can include an appropriate sensor for detecting a signal generated by broadcasting device 40, such as one or more communications units 64, a camera, a microphone, etc. Vicinity module 74 can be operable to receive from the sensor, or determine based on a signal received from the sensor, a signal strength of the received signal, which may account for one or more properties of the sensor, e.g., an antenna configuration of one or more communication units 64. Based on the parameters of the transmitted signal, the strength of the received signal, and a mathematical relationship between signal strength and distance, vicinity module 74 can estimate the distance between broadcasting device 40 and wearable computing device 20.

In some examples, the threshold distance can be a predefined value, e.g., a distance value determined by a manufacturer or programmer of mobile computing device 10 (and/or wearable computing device 20). In other examples, the threshold distance can be a user defined value, which one or more processors 60 can be operable to allow the user to define, e.g., using a user interface screen output for display at UI device 12. In some examples, the threshold distance may be selected to be a value that indicates that broadcasting device 40 and wearable computing device 20 are near each other, e.g., are sufficiently close that the user of devices 40 and 20 is likely to have possession of both devices 40 and 20 and/or is likely to have control of both devices 40 and 20. For example, the threshold distance may be selected to be a value that is approximately equal to a common room dimension (e.g., about 3 to 5 meters or about 9 to 15 feet). In other examples, the threshold distance may be selected to be lesser (e.g., less than about 3 meters) or greater (e.g., greater than about 5 meters, such as about 10 meters, about 15 meters, or about 20 meters).

Wearable computing device 20 can include additional components that, for clarity, are not shown in FIG. 2. For example, wearable computing device 20 can include a battery to provide power to the components of wearable computing device 20. Similarly, the components of wearable computing device 20 shown in FIG. 2 may not be necessary in every example of wearable computing device 20.

Figure 3:
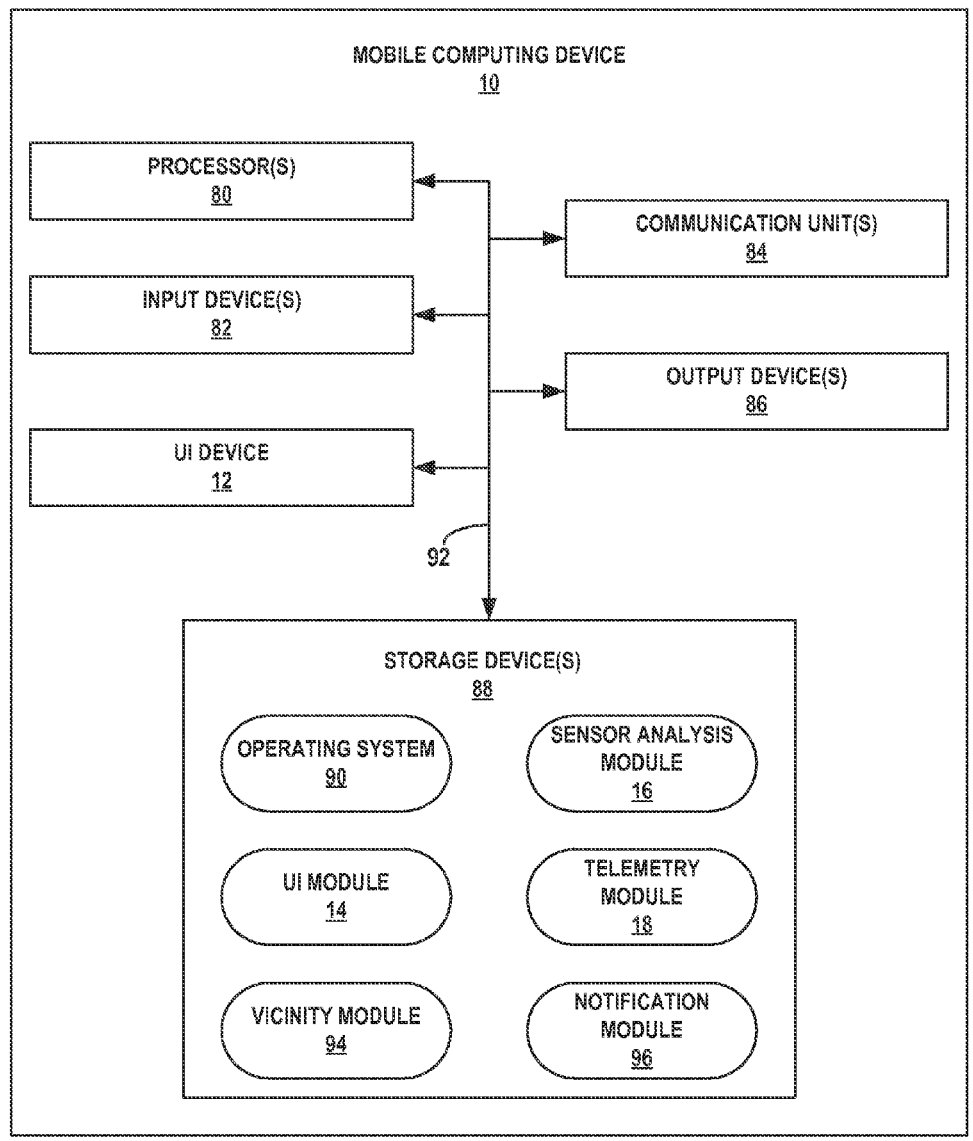
FIG. 3 is a block diagram illustrating further details of one example of a mobile computing device as shown in FIG. 1, in accordance with one or more techniques of the disclosure.

FIG. 3 is a block diagram illustrating further details of one example of a mobile computing device 10 as shown in FIG. 1, in accordance with one or more techniques of the disclosure. FIG. 3 illustrates only one particular example of mobile computing device 10 as shown in FIG. 1, and many other examples of mobile computing device 10 may be used in other instances.

As shown in the example of FIG. 3, mobile computing device 10 includes one or more processors 80, one or more input devices 82, one or more communication units 84, one or more output devices 86, one or more storage devices 88, and user interface (UI) device 12. In the example of FIG. 2, mobile computing device 10 further includes UI module 14, sensor analysis module 16, telemetry module 18, vicinity module 94, notification module 96, and operating system 90, which are executable by one or more processors 80. Each of components 12, 80, 82, 84, 86, and 88 are coupled (physically, communicatively, and/or operatively) using communication channels 92 for inter-component communications. In some examples, communication channels 92 may include a system bus, a network connection, an inter-process communication data structure, or any other method for communicating data. UI module 14, sensor analysis module 16, telemetry module 18, vicinity module 94, and operating system 90, may also communicate information with one another, as well as with other components in mobile computing device 10.

One or more processors 80, in one example, are configured to implement functionality and/or process instructions for execution within mobile computing device 10. For example, processors 80 may be capable of processing instructions stored by one or more storage devices 88. Examples of one or more processors 80 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 88 may be configured to store information within mobile computing device 10 during operation. Storage devices 88, in some examples, include a computer-readable storage medium or computer-readable storage device. In some examples, storage devices 88 include a temporary memory, meaning that a primary purpose of storage device 88 is not long-term storage. Storage devices 88, in some examples, include a volatile memory, meaning that storage device 88 does not maintain stored contents when power is not provided to storage device 88. Examples of volatile memories include random access memories (RAM), dynamic random access memories (DRAM), static random access memories (SRAM), and other forms of volatile memories known in the art. In some examples, storage devices 88 are used to store program instructions for execution by processors 80. Storage devices 88, in some examples, are used by software or applications running on mobile computing device 10 (e.g., sensor analysis module 16) to temporarily store information during program execution.

In some examples, storage devices 88 may further include one or more storage device 88 configured for longer-term storage of information. In some examples, storage devices 88 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Mobile computing device 10, in some examples, also includes one or more communication units 84. Mobile computing device 10, in one example, utilizes communication unit 84 to communicate with external devices via one or more networks, such as one or more wireless networks. Communication unit 84 may be a network interface card, such as an Ethernet card, an optical transceiver, a radio frequency transceiver, or any other type of device that can send and receive information. Other examples of such network interfaces may include Bluetooth, 3G, and WiFi radios computing devices as well as Universal Serial Bus (USB). In some examples, mobile computing device 10 utilizes communication unit 84 to wirelessly communicate with an external device such as wearable computing device 20. Communication unit 84 may be controlled by telemetry module 18.

Mobile computing device 10, in one example, also includes one or more input devices 82. Input device 82, in some examples, is configured to receive input from a user through tactile, audio, or video sources. Examples of input device 82 include a presence-sensitive device, such as a presence-sensitive display, a mouse, a keyboard, a voice responsive system, video camera, microphone or any other type of device for detecting a command from a user. In some examples, a presence-sensitive display includes a touch-sensitive display.

One or more output devices 86 may also be included in mobile computing device 10. Output device 86, in some examples, is configured to provide output to a user using tactile, audio, or video stimuli. Output device 86, in one example, includes a presence-sensitive display, a sound card, a video graphics adapter card, or any other type of device for converting a signal into an appropriate form understandable to humans or machines. Additional examples of output device 86 include a speaker, a cathode ray tube (CRT) monitor, a liquid crystal display (LCD), organic light emitting diode (OLED), or any other type of device that can generate intelligible output to a user. In some examples, UI device 12 may include functionality of one or more of input devices 82 and/or output devices 86.

Mobile computing device 10 also can include UI device 12. In some examples, UI device 12 is configured to receive tactile, audio, or visual input. In addition to receiving input from a user, UI device 12 can be configured to output content such as a GUI for display at a display device, such as a presence-sensitive display. In some examples, UI device 12 can include a presence-sensitive display that displays a GUI and receives input from a user using capacitive, inductive, and/or optical detection at or near the presence sensitive display. In some examples, UI device 12 is both one of input devices 44 and one of output devices 86.

In some examples, UI device 12 of mobile computing device 10 may include functionality of input devices 82 and/or output devices 86. In some examples, a presence-sensitive device may detect an object at and/or near the presence-sensitive device. As one example range, a presence-sensitive device may detect an object, such as a finger or stylus, which is within two inches or less of the presence-sensitive device. The presence-sensitive device may determine a location (e.g., an (x,y) coordinate) of the presence-sensitive device at which the object was detected. In another example range, a presence-sensitive device may detect an object six inches or less from the presence-sensitive device. Other example ranges are also possible. The presence-sensitive device may determine the location of the device selected by the object using capacitive, inductive, and/or optical recognition techniques. In some examples, the presence-sensitive device provides output to a user using tactile, audio, or video stimuli as described with respect to output device 86.

Mobile computing device 10 may include operating system 90. Operating system 90, in some examples, controls the operation of components of mobile computing device 10. For example, operating system 90, in one example, facilitates the communication of UI module 14 and sensor analysis module 16 with processors 80, communication units 84, storage devices 88, input devices 82, and output devices 86. UI module 14, telemetry module 18, vicinity module 94, and sensor analysis module 16 can each include program instructions and/or data that are executable by mobile computing device 10 (e.g., by one or more processors 80). As one example, UI module 14 can include instructions that cause mobile computing device 10 to perform one or more of the operations and actions described in the present disclosure.

Mobile computing device 10 may include notification module 96. Notification module 96 can be similar to or substantially the same as notification module 76 described with reference to FIG. 2. For example, notification module 96 may perform one or more functions to generate alerts and to send data to UI device module 12 to cause UI device 12 to display the generated alerts. Alerts generated by notification module 96 may include content such as text, graphics, audio, video, and the like that includes information indicative of an event that triggered notification module 96 to generate the alerts. For example, as described above, sensor analysis module 16 may determine, based on analysis of sensor data, that the broadcast sensor data should likely be associated with a user account of a user to which mobile computing device 10 belongs. In some examples, responsive to this determination, sensor analysis module 16 may instruct notification module 96 to output an alert soliciting user approval to associate the broadcast sensor data from broadcasting device 40 with the user account.

Mobile computing device 10 may include sensor analysis module 16. Sensor analysis module 16 can be similar to or substantially the same as sensor analysis module 26 described with reference to FIG. 2. In accordance with one or more examples of the disclosure, sensor analysis module 16 can be operable, e.g., by one or more processors 80, to determine whether to associate remote sensor data from sensor 46 of broadcasting device 40 with a user account of a user of mobile computing device 10. For example, sensor analysis module 16 can be operable to receive, from broadcasting device 40, first sensor data from sensors 46, and can also be operable to receive, from wearable computing device 20, second sensor data from sensors 34. Sensor analysis module 16 can be operable to receive the first and second sensor data from telemetry module 18, which can receive the first and second sensor data from wearable computing device 20 and broadcasting device 40 using one or more communication units 84.

Additionally, in some examples, sensor analysis module 16 can be operable to receive an indication from wearable computing device 20 that a distance between broadcasting device 40 and wearable computing device 20 is less than a threshold distance. As described above, vicinity module 74 of wearable computing device (FIG. 2) can be operable to determine that the distance is less than the threshold distance based at least in part on a signal generated by one of devices 40 and 20 and received by the other of devices 40 and 20. In some examples, vicinity module 94 can be operable to determine an approximate distance between devices 40 and 20 and compare the approximate distance to the threshold distance. Responsive to determining that the distance between broadcasting device 40 and wearable computing device 20 is less than the threshold distance, vicinity module 94 can be operable to communicate an indication of that the distance between mobile computing device 10 and wearable computing device 20 is less than the threshold distance to sensor analysis module 16. Alternatively or additionally, sensor analysis module 16 can be operable to receive the indication that the distance between broadcasting device 40 and wearable computing device 20 is less than a threshold distance, e.g., using one or more communication units 84.

In some examples, sensor analysis module 16 can use the indication that the distance between broadcasting device 40 and wearable computing device 20 is less than a threshold distance as an additional factor in determining a confidence score which is compared to a threshold to determine whether the data from broadcasting device 40 should be associated with a user account of a user of both of wearable computing device 20 and mobile computing device 10.

In these and other examples, sensor analysis module 16 may determine a threshold confidence score, and sensor analysis module 16 may only instruct notification module 96 to output an alert soliciting user approval if sensor analysis module 16 determines that the confidence score is below the threshold score. If sensor analysis module 16 determines that the confidence score is at or above the threshold score, for example, sensor analysis module 16 may associate the broadcast sensor data with the user account without instructing notification module 96 to output an alert soliciting user approval. Notification module 96 may, for example, initially solicit an overall user approval to operate in a mode described above, in which sensor analysis module 16 skips the step of soliciting user approval to associate remote sensor data with the user account when a confidence score is above the threshold, and may operate in this mode only in response to receiving such overall user approval.

In some examples, mobile computing device 10 can also include a vicinity module 94. In other examples, mobile computing device 10 may not include vicinity module 94. Vicinity module 94 can be similar to or substantially the same as vicinity module 74 described with reference to FIG. 2. For example, vicinity module 94 can be operable by one or more processors 80 to determine that a distance between broadcasting device 40 (FIG. 1) and mobile computing device 10 is less than a threshold distance, e.g., based at least in part on a signal generated by one of devices 40 and 10 and received by the other of devices 40 and 10.

Mobile computing device 10 can include additional components that, for clarity, are not shown in FIG. 3. For example, mobile computing device 10 can include a battery to provide power to the components of mobile computing device 10. Similarly, the components of mobile computing device 10 shown in FIG. 3 may not be necessary in every example of mobile computing device 10.

In other examples, instead of being operable to perform each of these steps, sensor analysis module 16 can be operable to perform other functions. For example, instead of being operable to determine whether to associate first sensor data from broadcasting device 40 with a user account in response to analysis of the first and second sensor data, sensor analysis module 16 may not be operable to perform this analysis and determination. Instead, in some examples, sensor analysis module 16 can be operable to receive, from wearable computing device 20, an instruction to associate the first sensor data from broadcasting device 40 with the user account. Other examples of the steps of the techniques described herein being performed by mobile computing device 10, wearable computing device 20, or both are also possible and within the scope of this disclosure.

Figure 4:
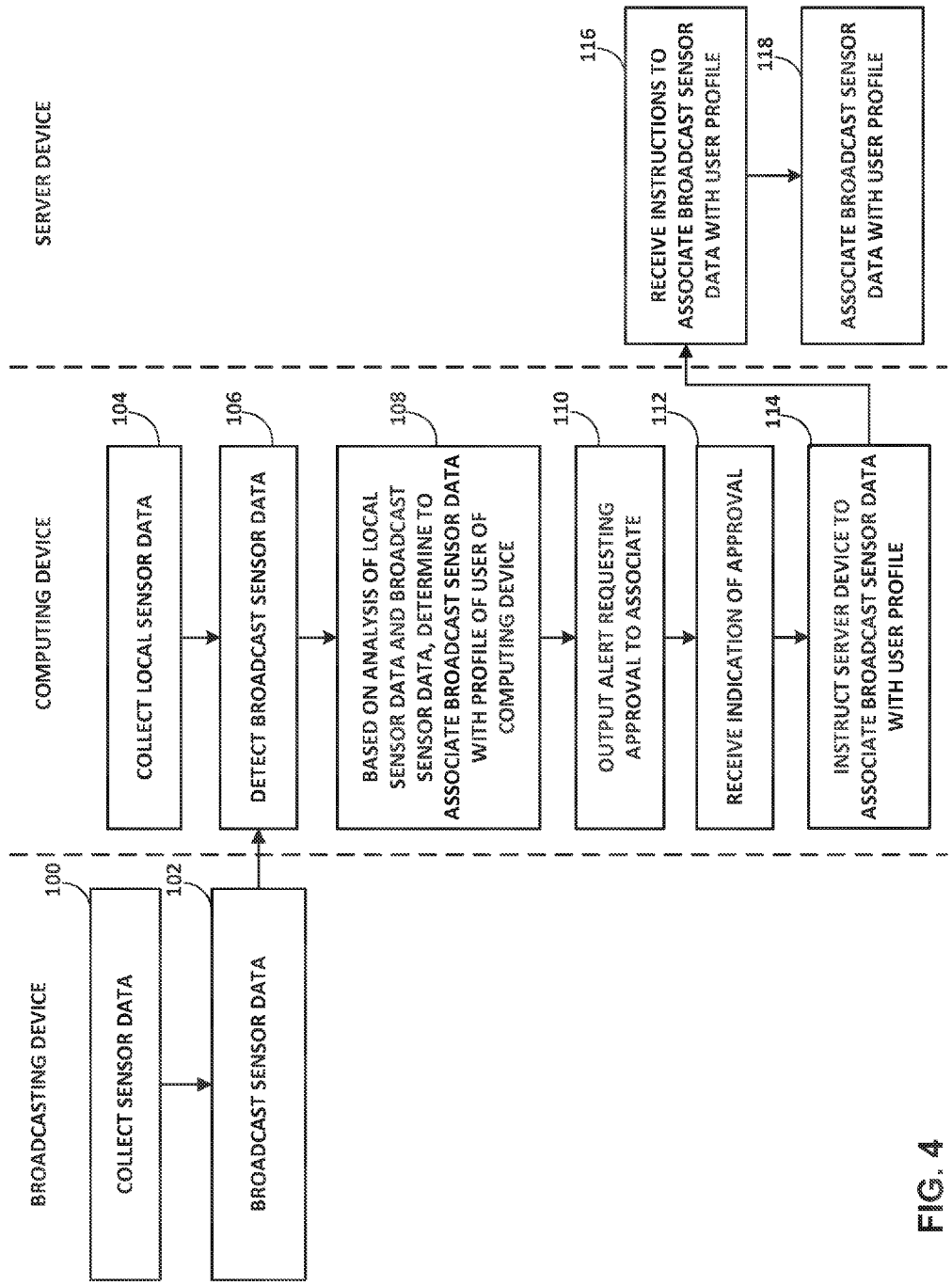
FIGS. 4-6 are flow diagrams illustrating example techniques for automatically determining whether to associate sensor data received from the broadcasting device with a user account, in accordance with one or more techniques of the disclosure.
Figure 5:
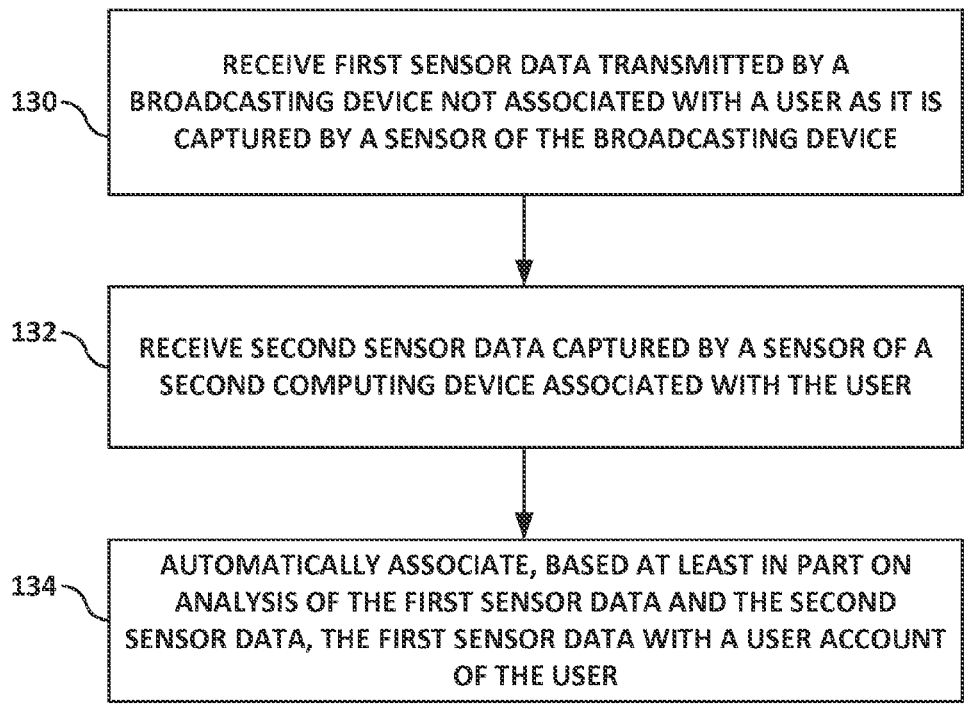
Figure 6:
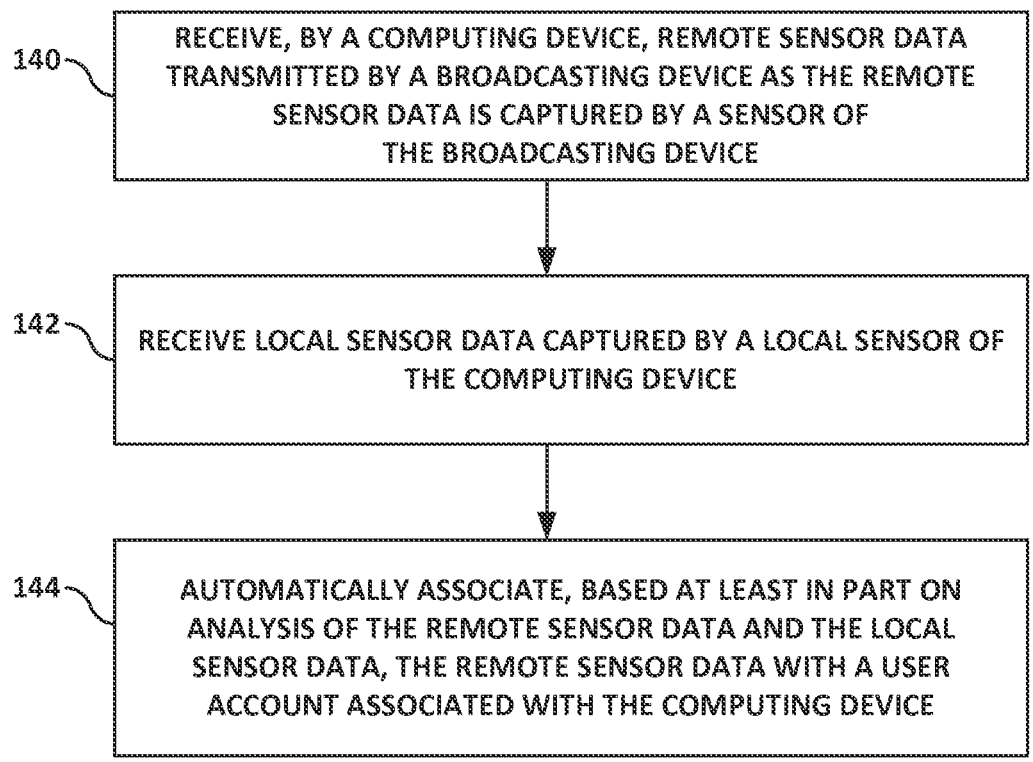

FIGS. 4-6 are flow diagrams illustrating example techniques for automatically determining whether to associate sensor data received from the broadcasting device with a user account, in accordance with one or more techniques of the disclosure. FIG. 4 is a flow diagram illustrating an example technique for determining whether to associate sensor data received from a broadcasting device with a user account. Some aspects of the technique of FIG. 4 may be performed by one or more processors of a computing device, such as mobile computing device 10 illustrated in FIGS. 1 and 3 or wearable computing device 20 illustrated in FIGS. 1 and 2, and other aspects of the technique of FIG. 4 may be performed by one or more processors of a broadcasting device, such as broadcasting device 40 illustrated in FIG. 1, and by one or more processors of a server device, such as server device 50 illustrated in FIG. 1. The technique of FIG. 4 will be described for purposes of example in terms of the example devices of FIGS. 1-3, although the technique of FIG. 4 may be performed by computing devices having configurations different than that of the example devices of FIGS. 1-3.

Broadcasting device 40 collects sensor data (100), and broadcasts the sensor data (102). As one example, the sensor data may be accelerometer data, such as sensed by sensors 46 of broadcasting device 40. For example, broadcasting device 40 may broadcast the sensor data using a communication protocol such as Bluetooth low energy (BLE), e.g., via telemetry module 48. In some examples, the sensor data may be broadcast by telemetry module 48 along with other information such as an identifier of broadcasting device 40.

A computing device, such as wearable computing device 20, can also collect local sensor data by one or more sensors, such as sensors 34 (104). As one example, the sensor data may be accelerometer data. The computing device detects a signal broadcasting sensor data from broadcasting device 40 (106). For example, telemetry module 28 of wearable computing device 20 can detect the signal from broadcasting device 40, and the signal may be sent by telemetry module 48 of broadcasting device 40. The computing device may analyze the broadcast sensor data and the local sensor data, and determine based on the analysis whether to associate broadcast sensor data with a user account of a user of the computing device (108). For purposes of explanation only, in the example of FIG. 4, sensor analysis module 26 can be operable by one or more processors 40 of wearable computing device 20 to determine that the broadcast sensor data should be associated with the user account. In situations in which wearable computing device 20 determines based on the analysis that the broadcast sensor data should not be associated with the user account, wearable computing device 20 may ignore the broadcast sensor data. Although described for purposes of example in terms of wearable computing device 20 analyzing the broadcast sensor data and the local sensor data, in some examples mobile computing device 10 may alternatively or additionally analyze the broadcast sensor data and the local sensor data to determine whether the broadcast sensor data should be associated with the user account.

In some examples, in response to determining that the broadcast sensor data should be associated with the user account, one or more processors of the computing device may cause an alert to be output requesting approval to associate the broadcast sensor data with the user account of the user associated with the computing device (110). For example, notification module 76 may be operable by one or more processors 60 of wearable computing device 20 to cause UI module 24 to output an alert, e.g., via UI device 22. For example, the alert may provide information identifying broadcasting device 40, indicate that sensor data associated with the broadcasting device 40 has been detected, and may inquire whether the user wishes to associate the broadcast sensor data with the user account. The alert may also indicate a mechanism that allows a response to the inquiry to be entered, such as by displaying an icon that the user can select to indicate approval or disapproval.

One or more processors associated with the computing device may receive data indicative of approval to associate the broadcast sensor data with the user account (112). In response to receiving the data indicative of approval to associate the broadcast sensor data with the user account, one or more processors of the computing device may send a communication instructing a server device, such as server device 50 of FIG. 1, to associate the broadcast sensor data with the user account (114). In some example aspects, after receiving the approval to associate, the one or more processors of wearable computing device 20 may thereafter continue to send the broadcast sensor data to server device 50 as the broadcast sensor is received, until the earliest of receiving an indication not to associate or detecting that broadcast sensor data is no longer being received, which may indicate that broadcasting device 40 has moved out of range of wearable computing device 20. In other examples, the computing device may detect a strength of a signal from broadcasting device 40, and may continue to send the broadcast sensor data to server device 50 as long as the strength of the signal is above a threshold signal strength.

Server device 50 receives the communication instructing to associate the broadcast sensor data with the user account, and also receives the broadcast sensor data itself (116). In some examples, server device 50 may determine which of a plurality of user accounts 54 with which the broadcast sensor data is intended to be associated. In some examples, server device 50 automatically associates the broadcast sensor data being relayed to it by wearable computing device 20 to the user account that is associated with wearable computing device 20. In response to receiving the instructions, the server device 50 associates the broadcast sensor data with the user account associated with the wearable computing device 20 (118). Server device 50 may continue to associate the broadcast sensor data with the user account as the broadcast sensor data is received from wearable computing device 20.

FIG. 5 is a flow diagram illustrating an example technique for determining whether to associate sensor data received from a broadcasting device with a user account. The technique of FIG. 5 may be performed by one or more processors of a computing device, such as mobile computing device 10 illustrated in FIGS. 1 and 3 or wearable computing device 20 illustrated in FIGS. 1 and 2. For purposes of illustration, the technique of FIG. 5 is described below within the context of mobile computing device 10 as described in FIGS. 1 and 3, although the technique of FIG. 5 may be performed by computing devices having configurations different than that of mobile computing device 10.

The technique of FIG. 5 includes receiving first sensor data transmitted by a broadcasting device not associated with a user as the first sensor data is captured by a sensor of the broadcasting device (130). The first sensor data may be received by a first computing device. For example, the first sensor data may be received by telemetry module 18 of mobile computing device 10. In some examples, the first sensor data may be data obtained by sensor 46 of broadcasting device 40 and transmitted by broadcasting device 40 via telemetry module 48. The broadcasting device may be considered not associated with the user in the sense that the user may not be logged in to or authenticated by the broadcasting device, in some examples. In some examples, the broadcasting device may be considered not associated with the user in the sense that the user does not own the broadcasting device, although the user may use the broadcasting device. In one example, the broadcasting device may be a smart fork owned by a restaurant that a user uses when dining at the restaurant. In another example, the broadcasting device may be a smart candy wrapper on a piece of candy that the user has purchased.

The technique of FIG. 5 includes receiving second sensor data captured by a sensor of a second computing device associated with the user (132). For example, the second sensor data may be received by telemetry module 18 of mobile computing device 10. In some examples, the second sensor data may be data obtained by sensor 34 of wearable computing device 20, and transmitted by wearable computing device 20 via telemetry module 28. In some examples, wearable computing device 20 may be considered associated with the user in the sense that the user owns wearable computing device 20 and the user is logged in to a user account on wearable computing device 20. In some examples, the first computing device and the second computing device may be the same computing device, e.g., wearable computing device 40.

The technique of FIG. 5 includes automatically associating, based at least in part on analysis of the first sensor data and the second sensor data, the first sensor data with a user account of the user (134). For example, sensor analysis module 16 of mobile computing device 10 may analyze the first and second sensor data, and may automatically associate the first sensor data from broadcasting device 40 with the user account based on the analysis. In some examples, the same user is associated with both of mobile computing device 10 and wearable computing device 20. In some examples, automatically associating the first sensor data with the user account can include transmitting, by mobile computing device 10, to server device 50, an instruction to associate the first sensor data with the user account.

In some examples, prior to automatically associating the remote sensor data with the user account, and responsive to automatically determining that the remote sensor data should be associated with the user account, mobile computing device 10 can output for display an alert requesting approval to associate the remote sensor data with the user account. Mobile computing device 10 can receive an indication of a user input, responsive to the alert, approving association of the remote sensor data with the user account. Mobile computing device 10 can automatically associate the remote sensor data with the user account responsive to receiving the indication of user input approving the association.

In these and other examples, sensor analysis module 16 of the first computing device (e.g., mobile computing device 10) can determine a confidence score based at least in part on analysis of the first sensor data and the second sensor data, where the confidence score indicates a likelihood that the first sensor data should be associated with the user account. Sensor analysis module 16 can automatically associate the first sensor data with the user account responsive to determining that the confidence score is greater than a threshold confidence score. In some examples, responsive to determining that the confidence score is greater than the threshold confidence score, sensor analysis module 16 can automatically associating the first sensor data with the user account without outputting an alert requesting approval to associate the first sensor data with the user account.

FIG. 6 is a flow diagram illustrating an example technique for determining whether to associate sensor data received from a broadcasting device with a user account. The technique of FIG. 6 may be performed by one or more processors of a computing device, such as mobile computing device 10 illustrated in FIGS. 1 and 3 or wearable computing device 20 illustrated in FIGS. 1 and 2. For purposes of illustration, the technique of FIG. 6 is described below within the context of wearable computing device 20 of FIGS. 1 and 2, although the technique of FIG. 6 may be performed by computing devices having configurations different than that of wearable computing device 20.

The technique of FIG. 6 includes receiving, by a computing device, remote sensor data transmitted by a broadcasting device as the remote sensor data is captured by a sensor of the broadcasting device (140). The technique of FIG. 6 includes receiving local sensor data captured by a local sensor of the computing device associated with the user (142). In some examples, the computing device may be a wearable computing device such as wearable computing device 20. In these and other examples, the broadcasting device may be one of a piece of cutlery, a cup, a kitchen appliance, a bathroom appliance, a candy wrapper, a toothbrush, a thermometer, a medical device, a chair, a door, a step, an item of fitness equipment, and a bag. In some examples, sensor 46 of broadcasting device 40 may be one of an accelerometer, a proximity sensor, an infrared sensor, a camera, a barometric pressure sensor, a temperature sensor, and a gyroscope, and the local sensor (e.g., sensor 34 of wearable computing device 20) may be one of an accelerometer, a proximity sensor, an infrared sensor, a camera, a temperature sensor, and a gyroscope. In some implementations, sensor 46 can be operable to detect an action of the broadcasting device being picked up. In some implementations, sensor 46 can be operable to detect an action of the broadcasting device being brought to a person's mouth. In some implementations, sensor 46 can be operable to detect an action of the broadcasting device being stepped upon or sat upon. In some implementations, sensor 46 can be operable to detect an action of the broadcasting device being used by a user.

The technique of FIG. 6 includes automatically associating, based at least in part on analysis of the remote sensor data and the local sensor data, the remote sensor data with a user account associated with the computing device (144). For example, sensor analysis module 26 of wearable computing device 20 can automatically associate the remote sensor data with the user account. In some examples, wearable computing device 40 can automatically associate the remote sensor data with the user account by transmitting via telemetry module 28, to a server device such as server device 50, an instruction to associate the remote sensor data with the user account.

In some examples, processor 60 of wearable computing device 20 can receive an indication of a wireless communication link between wearable computing device 20 and the broadcasting device 40, and sensor analysis module 26 can automatically associate the remote sensor data with the user account based at least in part on the indication of the wireless communication link between wearable computing device 20 and the broadcasting device 40. In these and other examples, wearable computing device 20 can, responsive to detecting that a signal strength of a wireless communication link between the computing device 20 and the broadcasting device 40 is below a threshold signal strength, transmit to the server device 50, an instruction to stop associating the remote sensor data with the user account. The wireless communication link may be according to a Bluetooth low energy protocol, for example.

In some examples, the computing device can include a notification module such as notification module 76 operable by at least one processor 60 to, prior to the sensor analysis module 26 automatically associating the remote sensor data with the user account, and responsive to the sensor analysis module 26 automatically determining that the remote sensor data should be associated with the user account, output for display an alert requesting approval to associate the remote sensor data with the user account. The notification module 76 can receive an indication of a user input, responsive to the alert, approving association of the remote sensor data with the user account, sensor analysis module 26 can associate the remote sensor data with a user account based at least in part on the notification module 76 receiving the indication.

In some examples, sensor analysis module 26 of wearable computing device 20 can determine a confidence score based at least in part on analysis of the remote sensor data and the local sensor data, wherein the confidence score indicates a likelihood that the remote sensor data should be associated with the user account, and sensor analysis module 26 can automatically associate the remote sensor data with the user account responsive to determining that the confidence score is greater than a threshold confidence score. Responsive to determining that the confidence score is greater than the threshold confidence score, sensor analysis module 26 can, in some examples, automatically associate the remote sensor data with the user account without outputting an alert requesting approval to associate the remote sensor data with the user account.

Clause 1. A method comprising: receiving, by a computing device, remote sensor data transmitted by a broadcasting device, wherein the remote sensor data is captured by a sensor of the broadcasting device; receiving local sensor data captured by a local sensor operatively coupled to the computing device; and automatically associating, by the computing device and based at least in part on analysis of the remote sensor data and the local sensor data, the remote sensor data with a user account associated with the computing device.

Clause 2. The method of clause 1, further comprising prior to automatically associating the remote sensor data with the user account, and responsive to automatically determining that the remote sensor data should be associated with the user account, outputting, by the computing device and for display, an alert requesting approval to associate the remote sensor data with the user account; and receiving, by the computing device and responsive to the alert, an indication of a user input approving association of the remote sensor data with the user account.

Clause 3. The method of clause 2, further comprising determining, by the computing device and based at least in part on analysis of the remote sensor data and the local sensor data, a confidence score that indicates a likelihood that the remote sensor data should be associated with the user account, wherein automatically associating comprises automatically associating the remote sensor data with the user account responsive to determining that the confidence score is greater than a threshold confidence score.

Clause 4. The method of clause 2, further comprising, responsive to determining that the confidence score is greater than the threshold confidence score, automatically associating the remote sensor data with the user account without outputting an alert requesting approval to associate the remote sensor data with the user account.

Clause 5. The method of any of clauses 1-4, wherein automatically associating the remote sensor data with the user account comprises transmitting, by the computing device, to a server device, an instruction to associate the remote sensor data with the user account.

Clause 6. The method of any of clauses 1 to 5, further comprising, responsive to detecting that a signal strength of a wireless communication link between the computing device and the broadcasting device is below a threshold signal strength, transmitting, by the computing device, to the server device, an instruction to stop associating the remote sensor data with the user account.

Clause 7. The method of any of clauses 1-6, further comprising: receiving, by the processor of the computing device, an indication of a wireless communication link between the computing device and the broadcasting device, wherein automatically associating comprises automatically associating, based at least in part on the indication of the wireless communication link between the computing device and the broadcasting device, the remote sensor data with the user account.

Clause 8. The method of any of clauses 1-7, wherein the sensor of the broadcasting device comprises at least one of an accelerometer, a proximity sensor, an infrared sensor, a camera, a barometric pressure sensor, a temperature sensor, or a gyroscope, and wherein the local sensor of the computing device comprises at least one of an accelerometer, a proximity sensor, an infrared sensor, a camera, a barometric pressure sensor, a temperature sensor, or a gyroscope.

Clause 9. The method of any of clauses 1-8, wherein the broadcasting device comprises at least one of a piece of cutlery, a cup, a kitchen appliance, a bathroom appliance, a food wrapper, a toothbrush, a thermometer, a medical device, a chair, a door, a step, an item of fitness equipment, or a bag.

Clause 10. The method of any of clauses 1-9, wherein the sensor of the broadcasting device is operable to detect one of an action of the broadcasting device being picked up, an action of the broadcasting device being stepped upon, or an action of the broadcasting device being used by a user.

Clause 11. The method of any of clauses 1-10, wherein the computing device comprises one of a wearable computing device, a mobile computing device, or a tablet computing device.

Clause 12. A method comprising: receiving, by a first computing device associated with a user, first sensor data, the first sensor data transmitted by a broadcasting device not associated with the user, wherein the first sensor data is captured by a sensor of the broadcasting device; receiving, by the first computing device, second sensor data, the second sensor data captured by a sensor operatively coupled to a second computing device associated with the user; and automatically associating, by the first computing device and based at least in part on analysis of the first sensor data and the second sensor data, the first sensor data with a user account associated with the user.

Clause 13. The method of clause 12, wherein the first computing device and the second computing device comprise a single computing device.

Clause 14. The method of clause 12 or 13, wherein the first computing device comprises a mobile computing device, and wherein the second computing device comprises a wearable computing device.

Clause 15. The method of any of clauses 12-14, further comprising:

prior to automatically associating the first sensor data with the user account, and responsive to automatically determining that the first sensor data should be associated with the user account, outputting, by the first computing device and for display, an alert requesting approval to associate the first sensor data with the user account; and receiving, by the first computing device and responsive to the alert, an indication of a user input approving association of the first sensor data with the user account.

Clause 16. The method of any of clauses 12-15, further comprising: determining, by the first computing device, a confidence score based at least in part on analysis of the first sensor data and the second sensor data, wherein the confidence score indicates a likelihood that the first sensor data should be associated with the user account, wherein automatically associating comprises automatically associating the first sensor data with the user account responsive to determining that the confidence score is greater than a threshold confidence score.

Clause 17. The method of clause 16, further comprising responsive to determining that the confidence score is greater than the threshold confidence score, automatically associating the first sensor data with the user account without outputting an alert requesting approval to associate the first sensor data with the user account.

Clause 18. The method of any of clauses 12-17, wherein automatically associating the first sensor data with the user account comprises transmitting, by the computing device, to a server device, an instruction to associate the first sensor data with the user account.

Clause 19. The method of any of clauses 12-17, wherein the first computing device comprises one of a wearable computing device, a mobile computing device, or a tablet computing device.

Clause 20. A device comprising: at least one processor; a telemetry module operable by the at least one processor to receive remote sensor data transmitted by a broadcasting device, wherein the remote sensor data is captured by a sensor of the broadcasting device; a local sensor operable to capture local sensor data; and a sensor analysis module automatically operable by the at least one processor to associate, based at least in part on analysis of the remote sensor data and the local sensor data, the remote sensor data with a user account associated with the computing device.

Clause 21. The device of clause 20, further comprising: a notification module operable by the at least one processor to, prior to the sensor analysis module automatically associating the remote sensor data with the user account, and responsive to the sensor analysis module automatically determining that the remote sensor data should be associated with the user account, output for display an alert requesting approval to associate the remote sensor data with the user account, wherein the notification module receives an indication of a user input, responsive to the alert, approving association of the remote sensor data with the user account, and wherein the sensor analysis module associates the remote sensor data with a user account based at least in part on the notification module receiving the indication.

Clause 22. The device of clause 20 or 21, further comprising: wherein the sensor analysis module determines, based at least in part on analysis of the remote sensor data and the local sensor data, a confidence score that indicates a likelihood that the remote sensor data should be associated with the user account, and wherein the sensor analysis module automatically associates the remote sensor data with the user account responsive to determining that the confidence score is greater than a threshold confidence score.

Clause 23. The device of clause 22, wherein the sensor analysis module, responsive to determining that the confidence score is greater than the threshold confidence score, automatically associates the remote sensor data with the user account without instructing the notification module to output an alert requesting approval to associate the remote sensor data with the user account.

Clause 24. The device of any of clauses 20-23, wherein the local sensor comprises one or more of an accelerometer, a proximity sensor, an infrared sensor, a camera, a barometric pressure sensor, a temperature sensor, and a gyroscope.

Clause 25. The device of any of clauses 20-24, wherein the telemetry module is operable by at least one of processor of the one or more mobile computing device processors and the one or more mobile computing device processors to, prior to the telemetry module receiving the remote sensor data transmitted by the broadcasting device, establish a wireless communication link between the computing device and the broadcasting device.

Clause 26. The device of any of clauses 20-25, wherein the computing device comprises one of a wearable computing device, a mobile computing device, or a tablet computing device.

Clause 27. A computer-readable storage medium storing instructions that, when executed, cause at least one processor of a computing device to: receive remote sensor data transmitted by a broadcasting device as the remote sensor data is captured by a sensor of the broadcasting device; receive local sensor data captured by a local sensor of the computing device; and automatically associate, based at least in part on analysis of the remote sensor data and the local sensor data, the remote sensor data with a user account associated with the computing device.

Clause 28. The computer-readable storage device of clause 27, further comprising instructions that, when executed, cause the at least one processor of the computing device to: prior to automatically associating the remote sensor data with the user account, and responsive to automatically determining that the remote sensor data should be associated with the user account, output, by the computing device and for display, an alert requesting approval to associate the remote sensor data with the user account; receive an indication of a user input, responsive to the alert, approving association of the remote sensor data with the user account; and associate the remote sensor data with a user account based at least in part on the notification module receiving the indication.

Clause 29. The computer-readable storage device of clause 27 or 28, wherein the instructions that, when executed, cause the at least one processor of the computing device to: determine, based at least in part on analysis of the remote sensor data and the local sensor data, a confidence score that indicates a likelihood that the remote sensor data should be associated with the user account; and automatically associate the remote sensor data with the user account responsive to determining that the confidence score is greater than a threshold confidence score.

Clause 30. The computer-readable storage device of clause 29, wherein the instructions that, when executed, cause the at least one processor of the computing device to, responsive to determining that the confidence score is greater than the threshold confidence score, automatically associate the remote sensor data with the user account without instructing the notification module to output an alert requesting approval to associate the remote sensor data with the user account.

Clause 31. A non-transitory computer-readable storage medium encoded with instructions that, when executed, cause at least one of a plurality of processors of a mobile computing device to perform any combination of the techniques of clauses 1-19.

Clause 32. A device comprising means for performing any combination of the techniques of clauses 1-19.

Clause 33. A system comprising means for performing any combination of the techniques of clauses 1-19.

In one or more examples, the functions described herein may be implemented in hardware, software, firmware, or any combination thereof. If implemented in software, the functions may be stored on or transmitted over, as one or more instructions or code, a computer-readable medium or computer-readable storage device and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media or computer-readable storage device, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, include compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by a computing device, remote motion sensor data transmitted by a broadcasting device, wherein the remote motion sensor data is captured by a sensor of the broadcasting device and is indicative of motion of the broadcasting device;
receiving, by the computing device, local motion sensor data captured by a local sensor operatively coupled to the computing device, wherein the local motion sensor data is indicative of motion of the computing device;
analyzing, by the computing device, the local motion sensor data and the remote sensor data to determine whether the remote motion sensor data correlates with the local motion sensor data;
responsive to determining, by the computing device, that the remote motion sensor data correlates with the local motion sensor data, determining, by the computing device, that a user of the computing device is using the broadcasting device; and
responsive to determining that the user of the computing device is using the broadcasting device, automatically storing, by the computing device and based at least in part on a user account associated with the user, an indication of the remote motion sensor data.

2. The method of claim 1, further comprising:
prior to automatically storing the remote motion sensor data as being associated with the user account, and responsive to determining that the user of the computing device is using the broadcasting device, outputting, by the computing device and for display, an alert requesting approval to associate the indication of the remote motion sensor data with the user account; and
receiving, by the computing device and responsive to the alert, an indication of a user input approving association of the indication of the remote motion sensor data with the user account.

3. The method of claim 1, further comprising:
determining, by the computing device and based at least in part on analysis of the remote motion sensor data and the local motion sensor data, a confidence score that indicates a likelihood that the user of the computing device is using the broadcasting device,
wherein automatically storing comprises automatically storing the indication of the remote motion sensor data responsive to determining that the confidence score is greater than a threshold confidence score.

4. The method of claim 3, further comprising, responsive to determining that the confidence score is greater than the threshold confidence score, automatically storing the indication of the remote motion sensor data without outputting an alert requesting approval to associate the indication of the remote motion sensor data with the user account.

5. The method of claim 1, wherein automatically storing the indication of the remote motion sensor data comprises transmitting, by the computing device, to a server device, an instruction to store the indication of the remote motion sensor data at the server device to the user account.

6. The method of claim 5, further comprising, responsive to detecting that a signal strength of a wireless communication link between the computing device and the broadcasting device is below a threshold signal strength, transmitting, by the computing device, to the server device, an instruction to stop storing the indication of the remote motion sensor data to the user account.

7. The method of claim 1, further comprising:
receiving, by the processor of the computing device, an indication of a wireless communication link between the computing device and the broadcasting device,
wherein automatically storing comprises automatically storing, based at least in part on the indication of the wireless communication link between the computing device and the broadcasting device, the remote motion sensor data.

8. The method of claim 1,
wherein the sensor of the broadcasting device comprises at least one of an accelerometer, a proximity sensor, an infrared sensor, a camera, a barometric pressure sensor, a temperature sensor, or a gyroscope, and
wherein the local sensor physically coupled to the computing device comprises at least one of an accelerometer, a proximity sensor, an infrared sensor, a camera, a barometric pressure sensor, a temperature sensor, or a gyroscope.

9. The method of claim 1, wherein the broadcasting device comprises at least one of a piece of cutlery, a cup, a kitchen appliance, a bathroom appliance, a food wrapper, a toothbrush, a thermometer, a medical device, a chair, a door, a step, an item of fitness equipment, or a bag.

10. The method of claim 1, wherein the computing device comprises one of a wearable computing device, a mobile computing device, or a tablet computing device.

11. A method comprising:
receiving, by a first computing device associated with a user, first motion sensor data, the first motion sensor data transmitted by a broadcasting device not associated with the user, wherein the first motion sensor data is captured by a sensor of the broadcasting device and is indicative of motion of the broadcasting device;
receiving, by the first computing device, second motion sensor data, the second motion sensor data captured by a sensor operatively coupled to a second computing device associated with the user, wherein the second motion sensor data is indicative of motion of the second computing device;
analyzing, by the first computing device, the first motion sensor data and the second sensor data to determine whether the second motion sensor data correlates with the first motion sensor data;
responsive to determining, by the first computing device, that the second motion sensor data correlates with the first motion sensor data, determining, by the first computing device, that the user is using the broadcasting device; and
responsive to determining that the user is using the broadcasting device, automatically storing, by the first computing device and based at least in part on a user account associated with the user, an indication of the first motion data.

12. The method of claim 11, wherein the first computing device and the second computing device comprise a single computing device.

13. The method of claim 11, wherein the first computing device comprises a mobile computing device, and wherein the second computing device comprises a wearable computing device.

14. The method of claim 11, further comprising:
prior to automatically storing the indication of the first motion sensor data, and responsive to determining that the user with which the first computing device is associated is using the broadcasting device, outputting, by the first computing device and for display, an alert requesting approval to associate the first motion sensor data with the user account; and receiving, by the first computing device and responsive to the alert, an indication of a user input approving storing of the indication of the first motion sensor data with the user account.

15. The method of claim 11, further comprising:

determining, by the first computing device, a confidence score based at least in part on analysis of the first motion sensor data and the second motion sensor data, wherein the confidence score indicates a likelihood that the user with which the first computing device is associated is using the broadcasting device, wherein automatically storing comprises automatically storing the indication of the first motion sensor data responsive to determining that the confidence score is greater than a threshold confidence score.

16. The method of claim 15, further comprising responsive to determining that the confidence score is greater than the threshold confidence score, automatically storing the indication of the first motion sensor data without outputting an alert requesting approval to associate the indication of the first motion sensor data with the user account.

17. The method of claim 11, wherein automatically storing the indication of the first motion sensor data in association with the user account comprises transmitting, by the computing device, to a server device, an instruction to store the indication of the first motion sensor data with the user account.

18. The method of claim 11, wherein the first computing device comprises one of a wearable computing device, a mobile computing device, or a tablet computing device.

19. A device comprising:

at least one processor;

a telemetry module operable by the at least one processor to receive remote motion sensor data transmitted by a broadcasting device, wherein the remote motion sensor data is captured by a sensor of the broadcasting device and is indicative of motion of the broadcasting device;

a local sensor operable to capture local motion sensor data that is indicative of motion of the device; and a sensor analysis module operable by the at least one processor to analyze the local motion sensor data and the remote sensor data to determine whether the remote motion sensor data correlates with the local motion sensor data, responsive to determining that the remote motion sensor data correlates with the local motion sensor data, determine that a user of the device is using the broadcasting device, and, responsive to determining that the user of the computing device is using the broadcasting device, store, based at least in part on a user account associated with the user an indication of the remote motion sensor data.

20. The device of claim 19, further comprising:

a notification module operable by the at least one processor to, prior to the sensor analysis module automatically storing indication of the remote motion sensor data in association with the user account, and responsive to the sensor analysis module automatically determining that user of the computing device is using the broadcasting device, output for display an alert requesting approval to associate the remote motion sensor data with the user account, wherein the notification module receives an indication of a user input, responsive to the alert, approving association of the remote motion sensor data with the user account, and wherein the sensor analysis module stores the indication of the remote motion sensor data based at least in part on the notification module receiving the indication.

21. The device of claim 19, further comprising:

wherein the sensor analysis module determines, based at least in part on analysis of the remote motion sensor data and the local motion sensor data, a confidence score that indicates a likelihood that the user of the computing device is using the broadcasting device, and wherein the sensor analysis module automatically stores the indication of the remote motion sensor data responsive to determining that the confidence score is greater than a threshold confidence score.

22. The device of claim 21, wherein the sensor analysis module, responsive to determining that the confidence score is greater than the threshold confidence score, automatically stores the indication of the remote motion sensor data without instructing the notification module to output an alert requesting approval to associate the remote motion sensor data with the user account.

23. The device of claim 19, wherein the local sensor comprises one or more of an accelerometer, a proximity sensor, an infrared sensor, a camera, a barometric pressure sensor, a temperature sensor, and a gyroscope.

24. The device of claim 19, wherein the telemetry module is operable by at least one of processor of the one or more mobile computing device processors and the one or more mobile computing device processors to, prior to the telemetry module receiving the remote sensor data transmitted by the broadcasting device, establish a wireless communication link between the computing device and the broadcasting device.

25. The device of claim 19, wherein the computing device comprises one of a wearable computing device, a mobile computing device, or a tablet computing device.

26. A computer-readable storage device storing instructions that, when executed, cause at least one processor of a computing device to:

receive remote motion sensor data transmitted by a broadcasting device, wherein the remote motion sensor data is captured by a sensor of the broadcasting device and is indicative of motion of the broadcasting device;

receive local motion sensor data captured by a local sensor operatively coupled to the computing device, wherein the local motion sensor data comprises motion data indicative of motion of the computing device;

analyze the local motion sensor data and the remote sensor data to determine whether the remote motion sensor data correlates with the local motion sensor data;

responsive to determining that the remote motion sensor data correlates with the local motion sensor data, determine that a user of the computing device is using the broadcasting device; and responsive to determining that the user of the computing device is using the broadcasting device, automatically store, based at least in part on a user account associated with the user, an indication of the remote motion sensor data.

27. The computer-readable storage device of claim 26, further comprising instructions that, when executed, cause the at least one processor of the computing device to:

prior to automatically storing the indication of the remote motion sensor data in association with the user account, and responsive to automatically determining that the user of the computing device is using the broadcasting device, output, by the computing device and for display, an alert requesting approval to associate the indication of the remote motion sensor data with the user account;

receive an indication of a user input, responsive to the alert, approving association of the indication of the remote motion sensor data in association with the user account; and store the indication of the remote motion sensor data based at least in part on the notification module receiving the indication.

28. The computer-readable storage device of claim 26, wherein the instructions that, when executed, cause the at least one processor of the computing device to:

determine, based at least in part on analysis of the remote motion sensor data and the local motion sensor data, a confidence score that indicates a likelihood that the user of the computing device is using the broadcasting device; and automatically store the indication of the remote motion sensor data responsive to determining that the confidence score is greater than a threshold confidence score.

* * * * *